United States Patent [19]

Bickford et al.

[11] Patent Number: 4,864,903
[45] Date of Patent: Sep. 12, 1989

[54] APPARATUS AND METHOD OF DETERMINING TORQUE, PRESENTING DIGITAL TORQUE READOUT AND AUTOMATIC CYCLING AND TERMINATION OF WRENCH OPERATION

[75] Inventors: John H. Bickford, Middletown; Jesse R. Meisterling, East Hampton, both of Conn.; Milton O. Smith, Bothell, Wash.; Geoffrey F. Kosciak, Stevensville, Mich.

[73] Assignee: Raymond Engineering Inc., Middletown, Conn.

[21] Appl. No.: 193,874

[22] Filed: Jun. 29, 1988

Related U.S. Application Data

[60] Division of Ser. No. 930,342, Nov. 12, 1986, Pat. No. 4,791,838, and a continuation-in-part of Ser. No. 869,178, May 30, 1986, Pat. No. 4,791,839.

[51] Int. Cl.⁴ .............................................. B25B 23/14
[52] U.S. Cl. ....................................................... 81/467
[58] Field of Search .......................................... 81/467

[56] References Cited

U.S. PATENT DOCUMENTS

| | | | |
|---|---|---|---|
| 4,571,696 | 2/1986 | Bitzer | 81/467 X |
| 4,685,050 | 8/1987 | Polzer et al. | 81/467 X |
| 4,730,254 | 3/1988 | Voden, Jr. | 81/467 X |

Primary Examiner—James G. Smith
Attorney, Agent, or Firm—Fishman, Dionne & Cantor

[57] ABSTRACT

Apparatus and a method are presented for determining the torque load applied to a fastening element by a fluid powered wrench, and displaying a digital readout of the torque. The operating pressure of the wrench, after compensation for the temperature of the pressure transducer, is converted to a torque measurement by a programmed microprocessor and the torque value is displayed on a digital readout. The system is useable with and adjusts for wrenches of several sizes by an input selector switch connected to the microprocessor. Apparatus and method are also presented for automatic cycling of a ratcheting hydraulic powered wrench and automatic termination of the tightening process when a predetermined torque has been delivered to the fastening element.

4 Claims, 26 Drawing Sheets

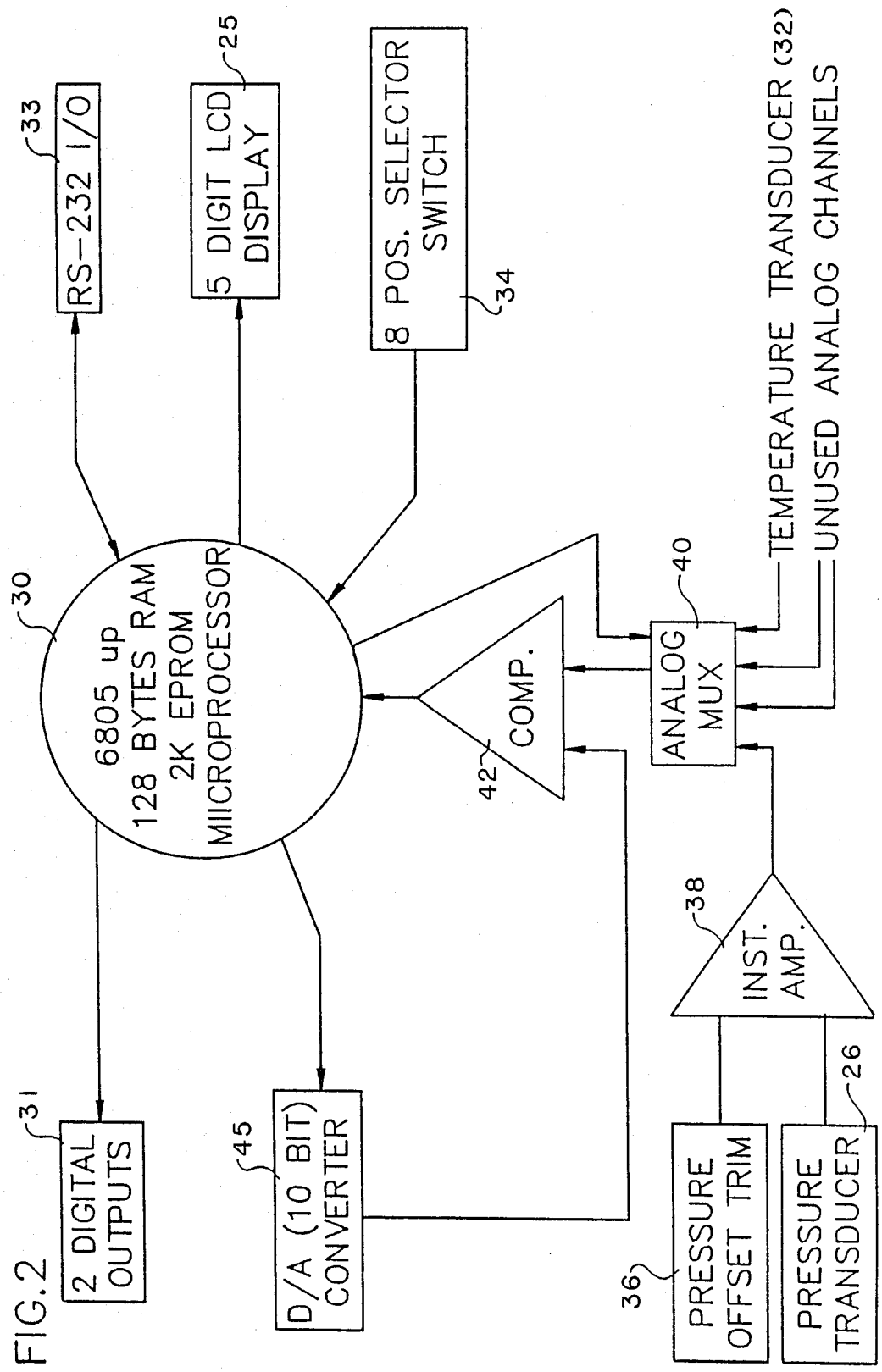

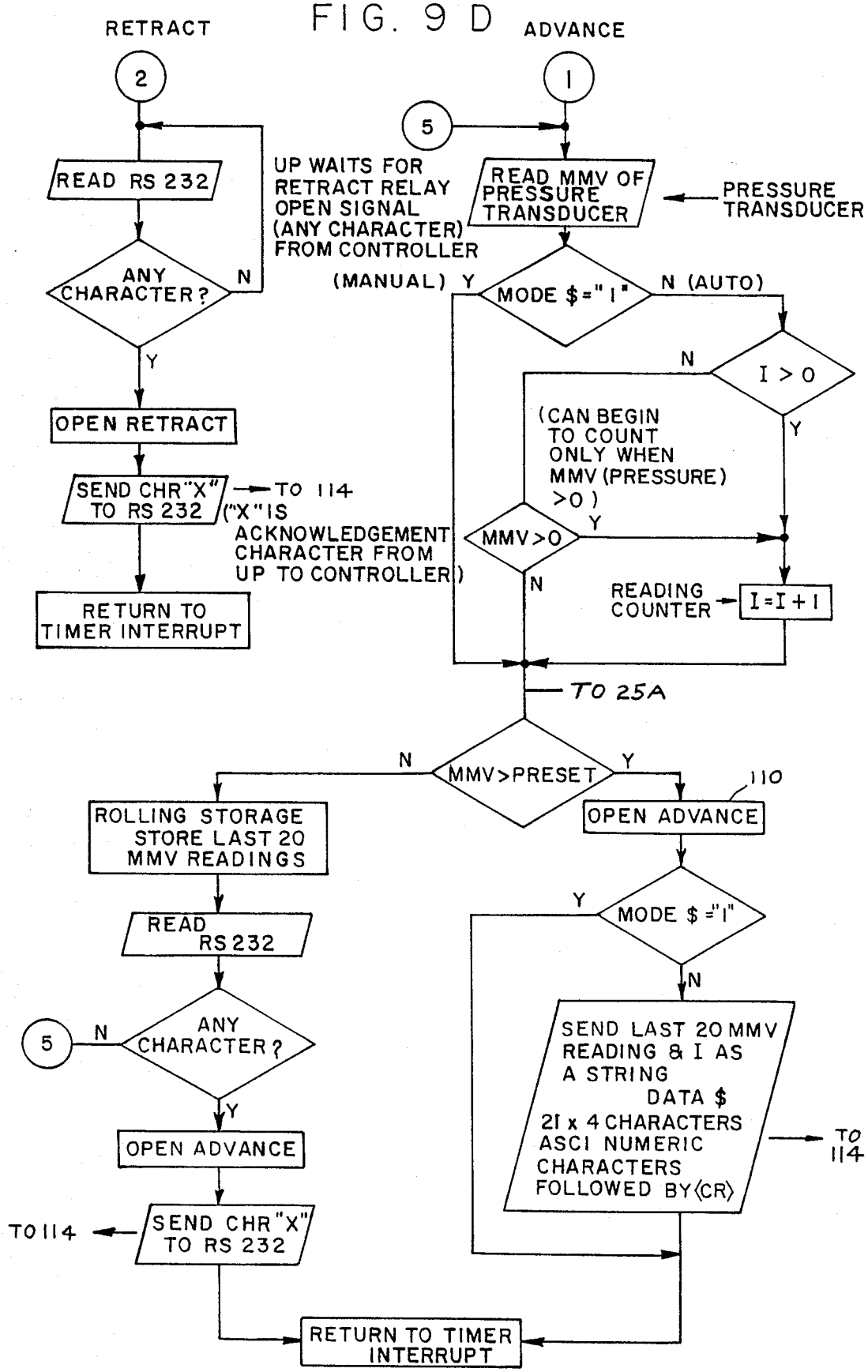

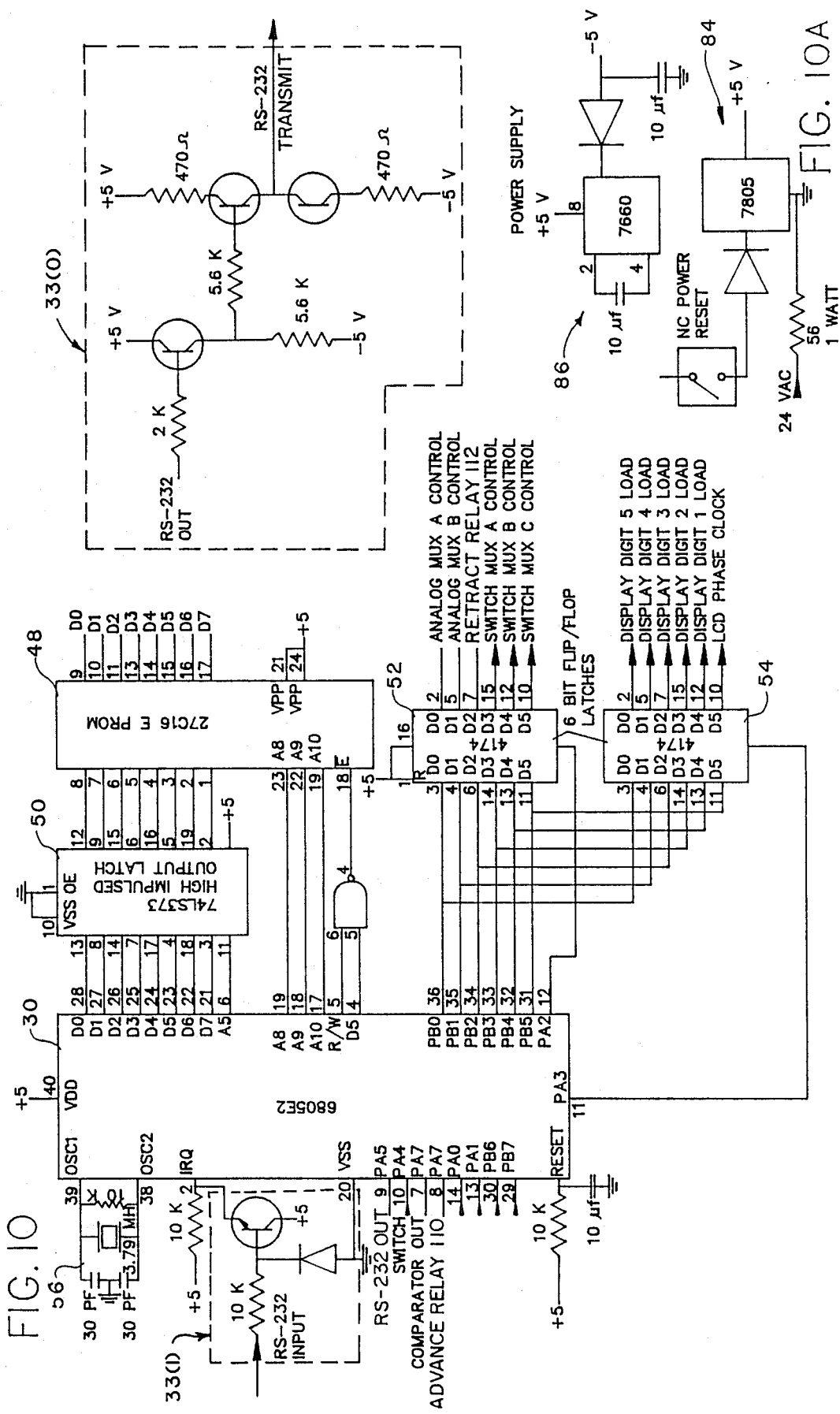

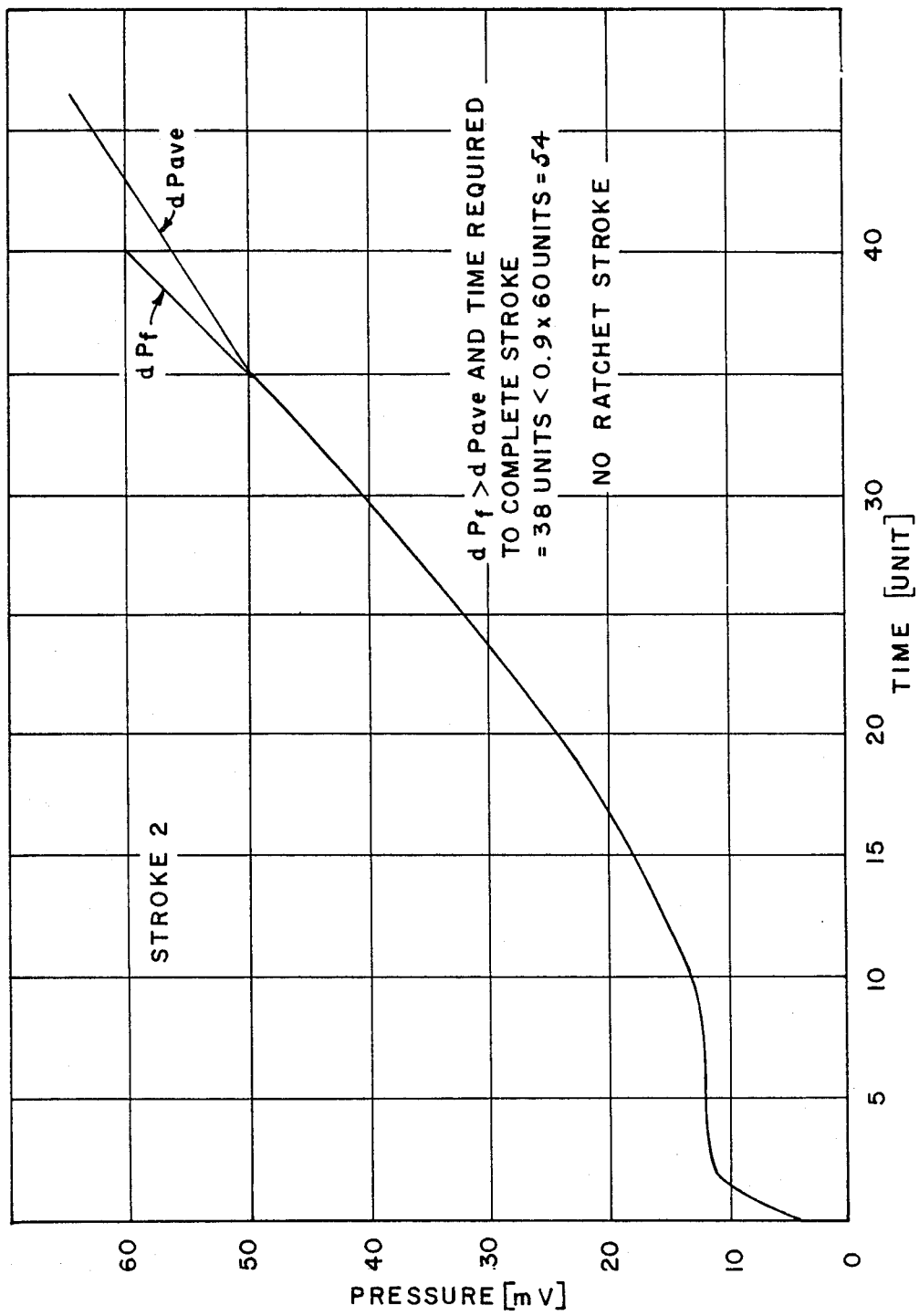

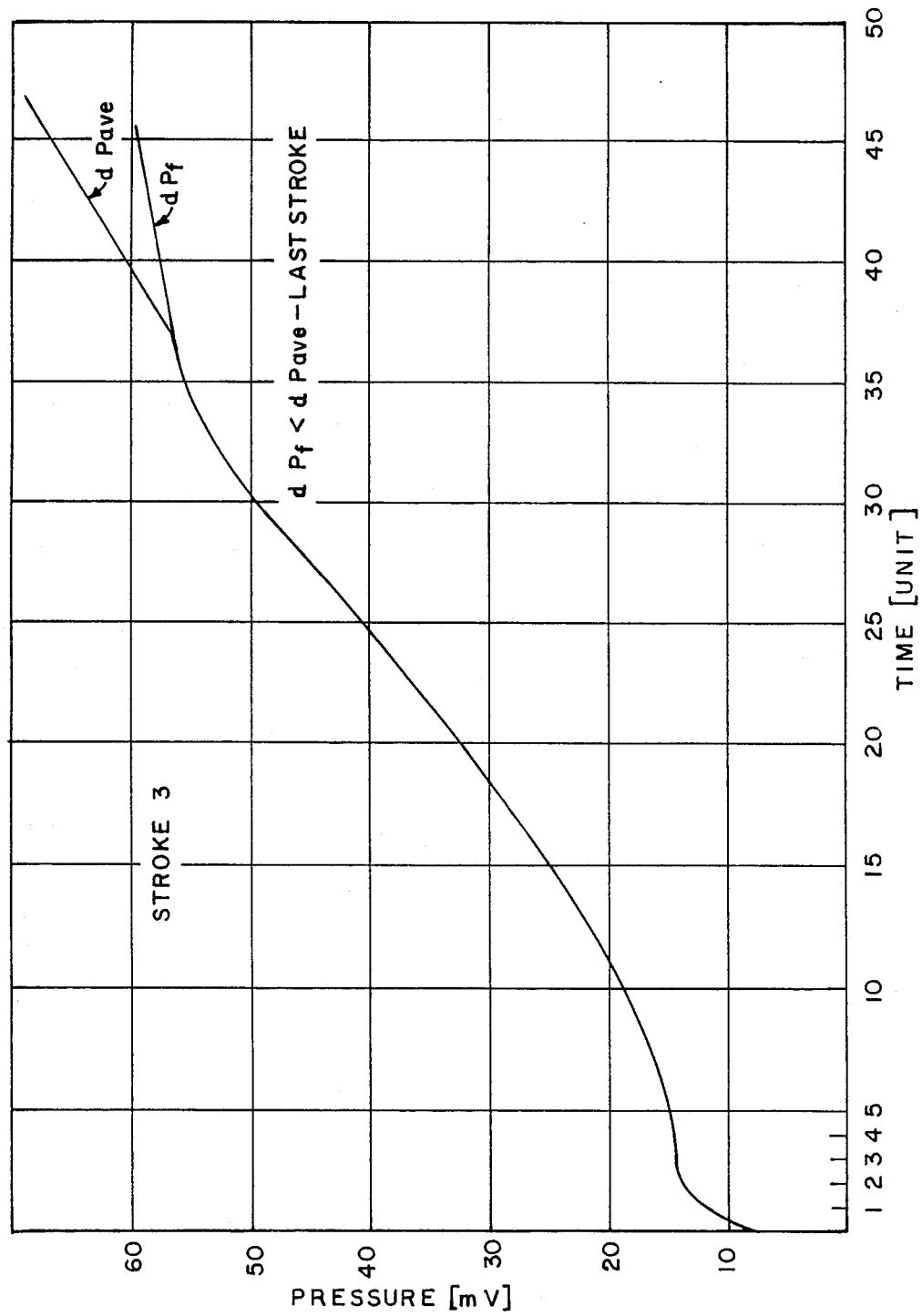

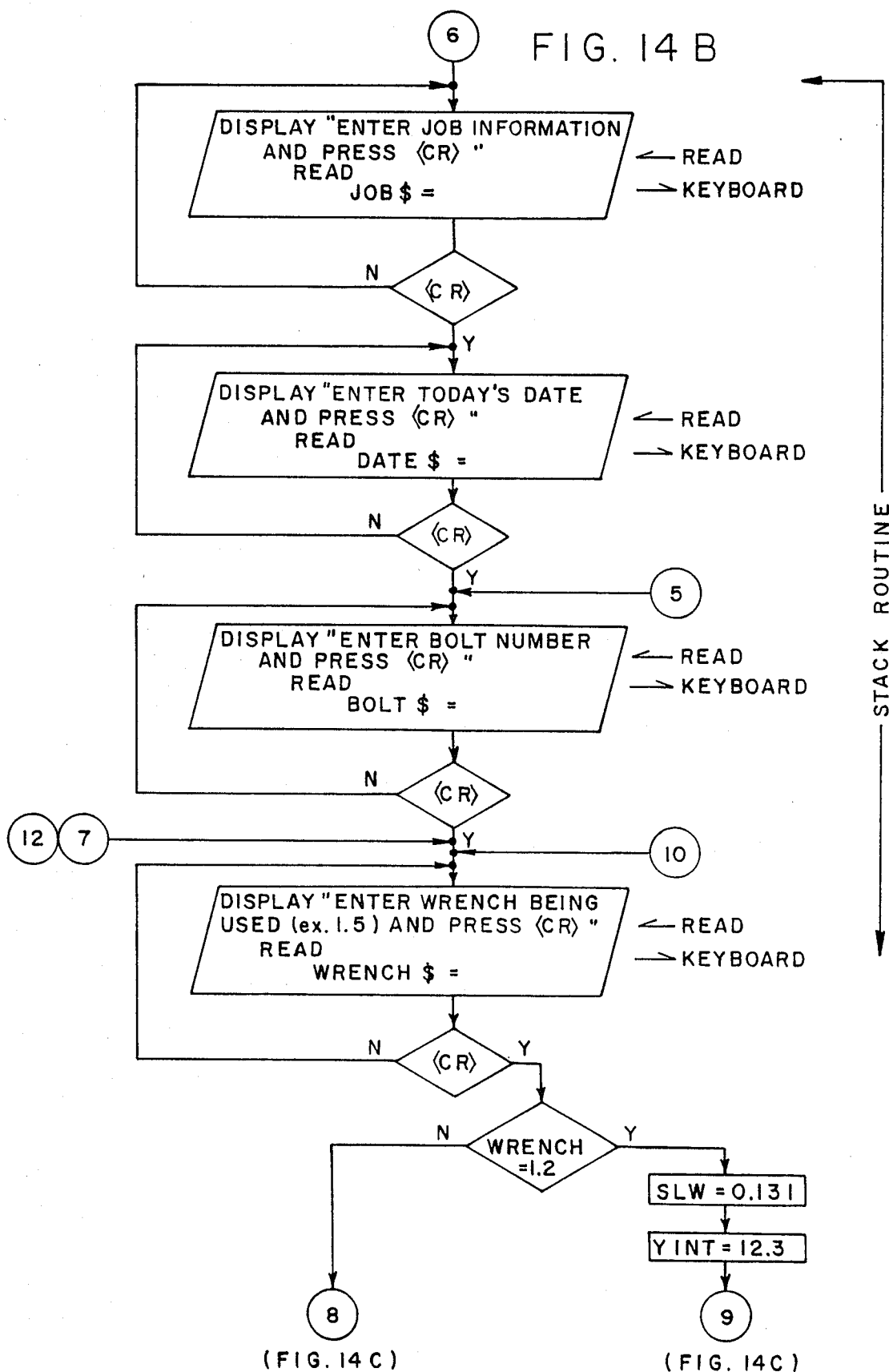

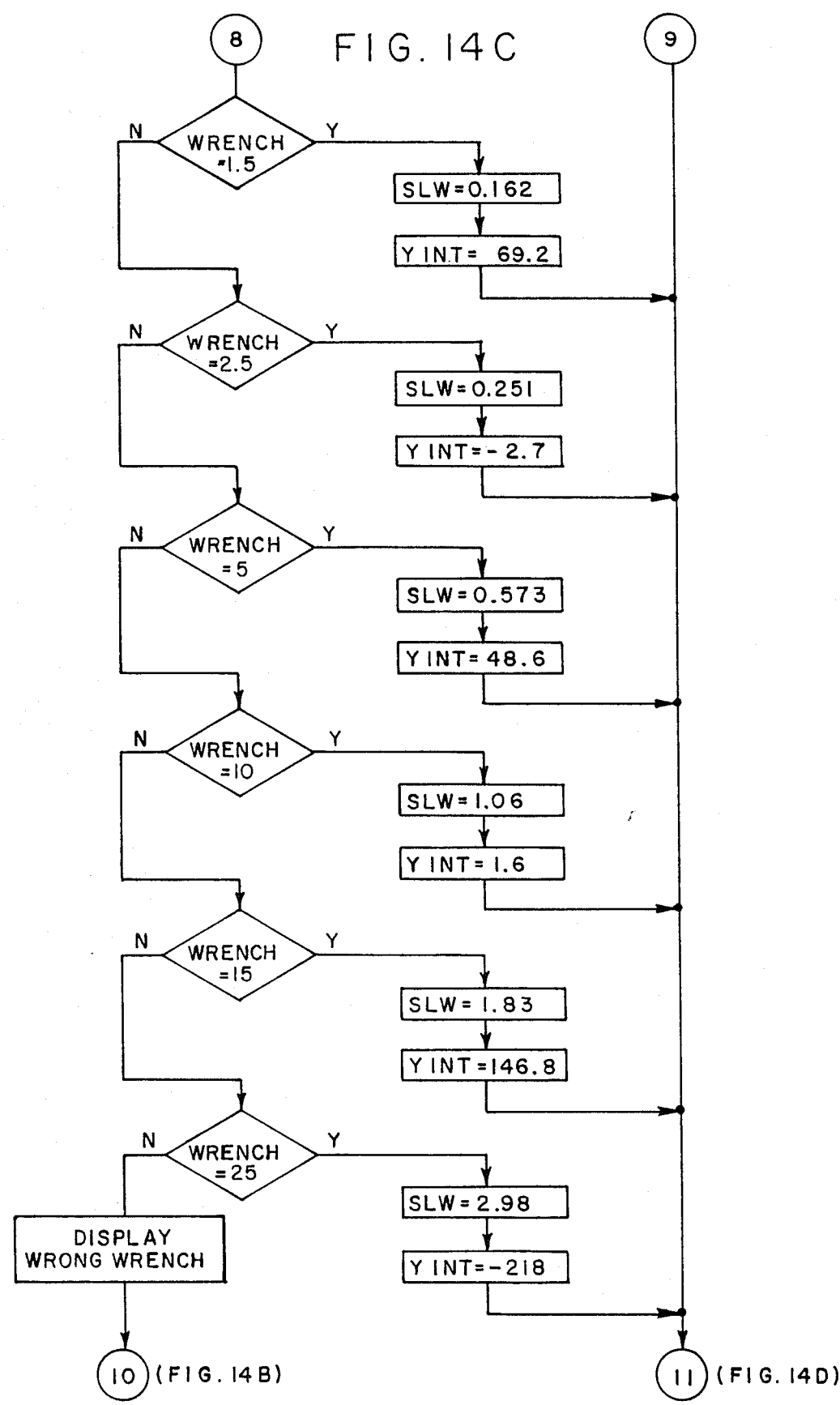

FIGURE 14 L

LIST OF VARIABLES FOR PROGRAM OF FIGURES 14A-14K

| | |
|---|---|
| CHECL | - (Values Possible: " "; "*"; "**") Checks if pump unpluged or system is ready for next bolt or system was aborted by use of dead man's switch. |
| JOB$ | - Alphanumeric, represents job information. |
| DATE$ | - Aplhanumeric, represents date. |
| BOLT$ | - Alphanumeric, represents bolt identification. |
| WRENCH | - Numeric, represents hydraulic wrench models (1.2, 1.5, 2.5, 5, 10, 15, 25 of Raymond Engineering). |
| TORQUE | - Numeric, input torque in ft.-lbs. |
| PRESSURE | - Numeric, input pressure calculated from torque. |
| SWL | - Numeric, slope of wrench characteristic. |
| YINT | - Numeric, Y-intercept of wrench characteristic. |
| PRESET | - Numeric, target preset pressure in mV. |
| MODE | - Numeric, constant determining operating mode (auto manual). |
| J | - Counter. |
| N | - Count corresponding to 3sec of the time (to be determined by program). |
| IST | - Wrench Stroke counter. |
| I | - Counter of pressure points within the stroke. |
| MMV(1) | - Pressure reading in mV of pressure transducer. |
| P1 | - Value of first pressure point. |
| IP | - Number of pressure points taken during the first stroke. |
| SLOPE | - Overall average slope between two readings calculated using change in pressure from the first to the last data point (dPave). |
| SLEND | - Average slope between two readings calculated using change in pressure for last 10 data points ($dP_f$). |
| FLAG | - Constant = 0 or = 1 when first good stroke is encountered. |

APPARATUS AND METHOD OF DETERMINING TORQUE, PRESENTING DIGITAL TORQUE READOUT AND AUTOMATIC CYCLING AND TERMINATION OF WRENCH OPERATION

FIELD OF THE INVENTION

This invention relates to the field of fluid powered torque wrenches. More particularly, this invention relates to the field of torque measurement of fluid powered torque wrenches, automatic cycling of fluid powered torque wrenches and automatic termination of the tightening operation when a predetermined torque is delivered to a fastening element.

DISCUSSION OF THE PRIOR ART

Fluid powered torque wrenches are well known in the art. By way of example, one type of a ratcheting, hydraulically powered torque wrench is disclosed in U.S. Pat. No. 3,745,858. An improved version of that torque wrench is disclosed in application Ser. No. 745,404, filed June 14, 1985. Both U.S. Pat. No. 3,745,858 and application Ser. No. 745,404 are owned by the assignee hereof and are incorporated herein by reference.

In operating hydraulic torque wrench systems, it is important to know the output, i.e., the torque, generated by the wrench. Prior art torque measurement systems have been susceptible to significant errors which impair the accuracy of such systems. As a result, there has been a long recognized need in the art to improve the torque measurement of such systems.

In general, prior art systems attempt to measure torque by measuring the pressure level (i.e., p.s.i.) of the pump which generates the pressurized operating fluid for the wrench. The p.s.i. output level of the pump is displayed and read on a gage to supposedly reflect the torque output of the wrench.

The above discussed prior art torque measurement systems are deficient and inaccurate in several respects. In a typical prior art system, the maximum torque produced by the tool is determined by manual adjustment of a pressure regulator in the hydraulic line which feeds the drive end of the hydraulic cylinder which powers the tool. The operator usually refers to a table or graph furnished by the manufacturer to determine the approximate cylinder pressure for a given output torque. The operator then repeatedly operates control switches in a pendant to advance and then to retract the drive cylinder of the wrench to tighten the bolt. A ratchet in the wrench converts this reciprocating cylinder motion into continuous clockwise or counterclockwise motion of the nut. The operator keeps operating the switches until the wrench stalls at the preselected pressure. Both the pressure selection and operation of the wrench takes operator skill and time.

Meanwhile a second mechanic must hold the reaction end of the wrench against a reaction surface on the workpiece. If he does not do this the wrench will not ratchet properly (because of backlash between drive bar and socket, socket and nut, etc.).

The torque produced by prior present hydraulic wrenches is determined by reading p.s.i. measurements on a hydraulic pressure gage on the pumping system which powers the wrench. One of the more significant problems with these prior art systems is that they sense and display pressure (p.s.i.) levels, whereas torque (ft. lbs.) is the true parameter of interest, because bolt tightening specifications are expressed in torque. Since a pump may be used with a variety of wrenches (developing different amounts of torque for the same supply pressure), means must be provided to account for the different wrenches. Some systems merely provide a gage calibrated in pump pressure, plus supplemental conversion charts to convert pressure to torque for various wrenches. Other prior art systems attempt to present a torque readout or sorts by the use of a pressure gage marked in several torque ranges rather than in psi values. However, a different torque range or scale must be used for each wrench size, making the system susceptible to error and misinterpretation. All of this can be very confusing to and can be misread or misinterpreted by the operator, and can lead to incorrect torques on the bolts being tightened.

In prior art systems, the wrench must be manually cycled a number of times by the operator to reach a desired torque level; and the operator must manually reset a relief valve to change the desired torque level to be delivered to a fastener by the wrench. Both of these requirements depend on the accuracy and reliability of the operator and present opportunities for error. Manual cycling is time consuming, since the operator must decide to initiate each wrench cycle and do so. The present invention reduces to time required to tighten a fastener by the feature of automatic cycling of the wrench. Also, when the wrench cycle terminates on each stroke, the operator does not know whether the bolt is fully tightened to its desired torque level or the wrench has simply bottomed out. This can lead to serious error if the operator mistakes bottoming out in a cycle for full tightening. That potential for serious error is eliminated by the present invention where the wrench is automatically recycled until the desired torque level is reached.

SUMMARY OF THE INVENTION

The above discussed and other problems and deficiencies of the prior art are eliminated or significantly reduced by the present invention. In accordance with the present invention, the parameter of interest, i.e., torque, is determined and displayed in a digital readout. By determining torque and presenting a digital readout of the measured torque, the present invention alleviates or eliminates the problems which made the prior art systems error prone and inaccurate. Also, a desired torque level is selected and the wrench is automatically cycled to achieve the predetermined torque level, and then operation is terminated.

In accordance with the present invention, torque is determined by a system which includes a transducer which converts the operating pressure of a hydraulic wrench to an analog electrical signal. That analog signal is then digitized, delivered as an input to a microprocessor or computer. The output of a temperature transducer is also digitized and delivered to the microprocessor to compensate for temperature of the pressure transducer. Another input informs the microprocessor or computer of the particular wrench being used in the system. The microprocessor or computer then operates on the input to produce an output signal commensurate with torque. That torque output signal is then delivered to and displayed on a numeric (or alpha/numeric) display as a direct readout of torque. The output from the microprocessor can be programmed to produce a torque output in any desired system of units (e.g. pound-feet or Newton-meters).

The system of the present invention has a principal feature and advantage of presenting torque as a direct readout in a digital display. This does away with the need for the use of conversion charts or tables to convert psi to torque and eliminates a serious source of error in prior art systems. Also when the operator is adjusting the manually operated pressure relief valve to preset the cutoff torque of the wrench, the operator is guided by a real time direct digital display of the torque which each setting of the relief valve would produce, rather than being guided by readings on a pressure gage. As a result, the operator can adjust cutoff pressure to the nearest desired lb-ft (or equivalent), whereas with prior art systems the operator can only set the valve to the nearest cardinal point on the gage, which may be 25 to 50 lb-ft apart. The system of the present invention also has the dual capability to display pump pressure on the digital readout if that parameter is of interest. The system also is capable of direct digital readout of torque for a range of wrench sizes used with the system, thus eliminating the need for gages with overlaps or multiple displays for different wrenches.

The system of the present invention also has a principal feature and advantage of automatic cycling of the wrench until a preselected torque level is reached, whereupon the supply of pressurized operating fluid to the wrench is discontinued to terminate operation of the wrench. This automatic cycling and termination feature has the significant advantages of faster operation of the wrench, elimination or reduction of operator error, more reliable and accurate operation of the wrench to impose the desired torque on the fastening element, and the ability to obtain a documented history of the tightening of the fastener.

The above discussed and other features and advantages of the present invention will be apparent to and understood by those skilled in the art from the following detailed description and drawings.

BRIEF DESCRIPTION OF THE DRAWINGS

Referring now to the drawings, wherein like elements are numbered alike in the sesveral FIGURES:

FIG. 2 is a functional diagram of the digital torque readout system of the present invention.

FIG. 5A is a schematic diagram of a power supply unit used in the present invention.

FIG. 9C and 9D are flow charts for the automatic cycling and termination feature of the present invention;

FIG. 10 is a version of the block diagram of FIG. 5 modified for the automatic cycling and termination of the present invention;

FIGS. 11-13 are graphs of pressure vs time showing automatic cycling and termination;

DESCRIPTION OF THE INVENTION

Figure 1:
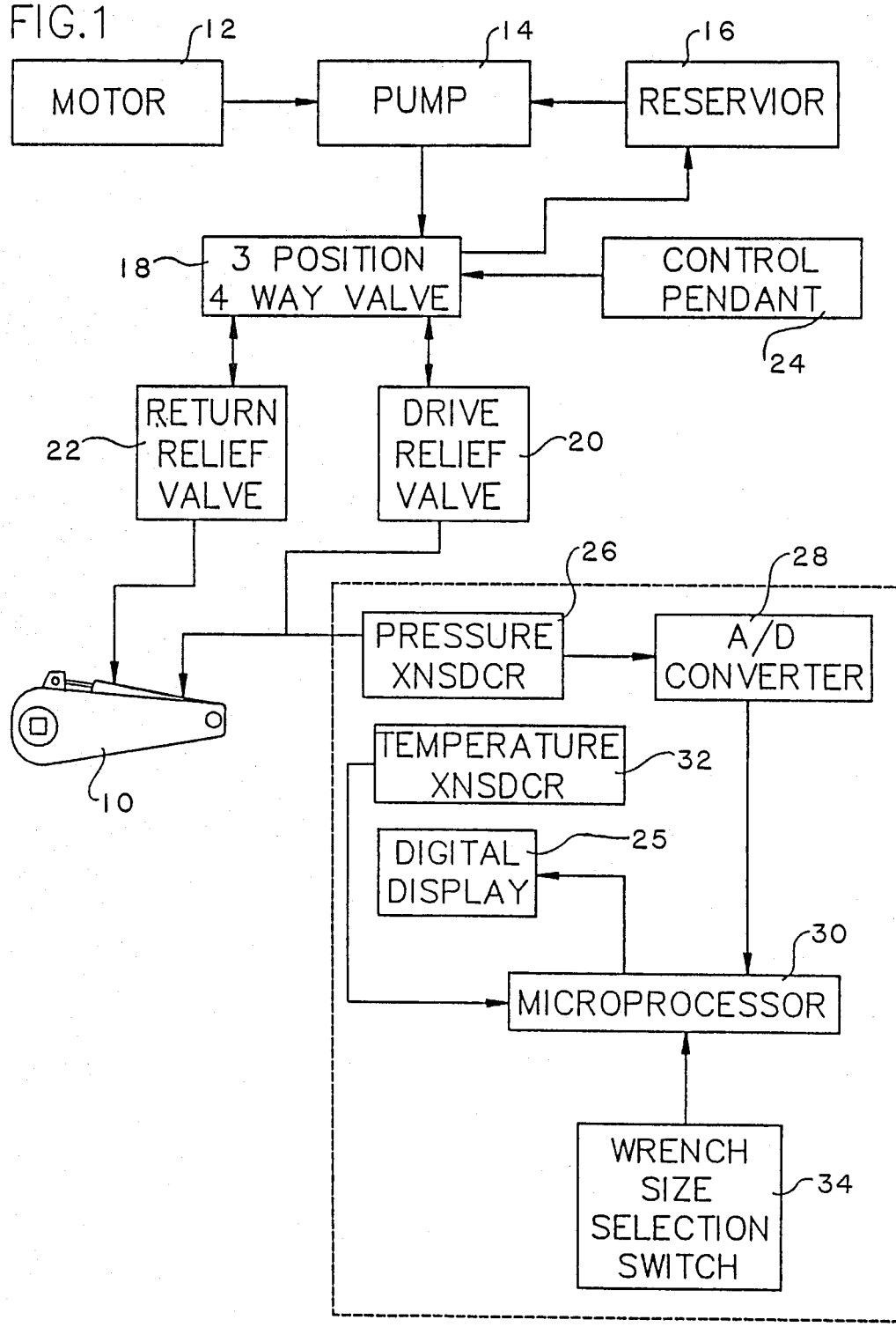
FIG. 1 is a block diagram of the torque measurement and digital torque readout system of the present invention.

Referring first to FIG. 1, a block diagram is shown of the overall system of the present invention. The system includes a conventional hydraulically powered torque wrench 10 (such as identified above) which is powered by a motor 12 and pump 14 supplied from a fluid reservoir 16. Pump 14 delivers pressurized hydraulic fluid to wrench 10 via a manually adjustable pressure relief valve 20, a 3 position 4 way valve 18 and drive and relief valve 22. A control pendant 24 (which may be suspended on a cable and be hand or foot operated, or may be mounted on the wrench or on some other part of the system) controls the position of valve 18 to operate wrench 10 in either a drive stroke or a return stroke. Manually adjustable pressure regulator 20 is set (and can be adjusted as may be required) to establish a maximum pressure level. Return relief valve 22 is typically set to operate at some relatively low pressure (e.g., 400 p.s.i.) to prevent overpressurization of the return side of the drive cylinder of the wrench. Wrench 10 includes a ratchet mechanism so that the wrench can be repeatedly cycled to tighten a fastener such as a nut or bolt. The elements 10-24 described above are all found in a prior art wrench operating system.

Still referring to FIG. 1, the system of the present invention also includes apparatus for determining and for the digital display of the real time torque level of the wrench. That apparatus includes a pressure transducer 26 which senses the pressure level on the drive side of the wrench and generates a voltage output signal. That voltage signal from transducer 26 is delivered to an analog to digital converter 28 (which includes a multiplexer 40, a comparator 42 and a D/A converter 45 see FIGS. 2 and 4) which, in turn, is connected to a microprocessor 30. A temperature sensor 32 (an AD 590 transducer) senses the temperature at which the pressure transducer is operating and delivers a temperature input signal to microprocessor 30 which compensates for temperature deviation from a standard 75° F. "room temperature". A wrench size selection switch unit 34 delivers an input signal to microprocessor 30 based on the size of the wrench being used in the system. Microprocessor 30 is programmed to process the various input signals and generate a digital output of the real time torque level of the wrench as it operates which is displayed on a liquid crystal (LCD) display 25.

Referring now to FIG. 2, a functional diagram of the torque measuring and display system is shown. Pressure transducer 26 is a half bridge strain gage transducer such as an Model, MFP 0-10,000 transducer available from DJ Instruments. The output signal from transducer 26 is balanced against a pressure offset trim bridge 36, and the signals from transducer 26 and trim bridge 36 are delivered to an instrumentation amplifier 38. The output from instrumentation amplifier 38 is delivered to an analog multiplexer 40 which also receives an input signal from temperature transducer 32. Based on a control signal from microprocessor 30, multiplexer 40 delivers either the pressure signal or the temperatures signal to a comparator 42. Microprocessor 30 delivers digital signals to digital to analog converter 44 which, in turn, delivers analog voltage to comparator 42. Comparator 42 compares the input from multiplexer 40 (either pressure or temperature signals) with the input from D/A converter 44. When the input to comparator 42 from multiplexer 40 exceeds the output from D/A converter 44, the output state of comparator 42 delivers a low logic signal to microprocessor 30. When the input to comparator 42 from multiplexer 40 is lower than the output from D/A converter 44, the output state of comparator 42 delivers a high logic signal to microprocessor 30. The microprocessor 30 determines the pressure or temperature level by matching the D/A converter output to the pressure or temperature sensor.

Wrench size selector switch unit 34 also delivers an input signal to microprocessor 30 to inform the microprocessor of the size of the wrench being operated. The signal from selector switch unit 34 determines a ratio or multiplication factor and offset factor which is stored in permanent memory and which is used by microprocessor 30 to convert the pressure information (as temperature compensated) to a torque value. Microprocessor 30 then generates a torque signal which is delivered to and displayed on LCD display unit 25.

Microprocessor 30 also has the capacity to drive other digital outputs 31 and communicate with an external computer 33.

Figure 4:
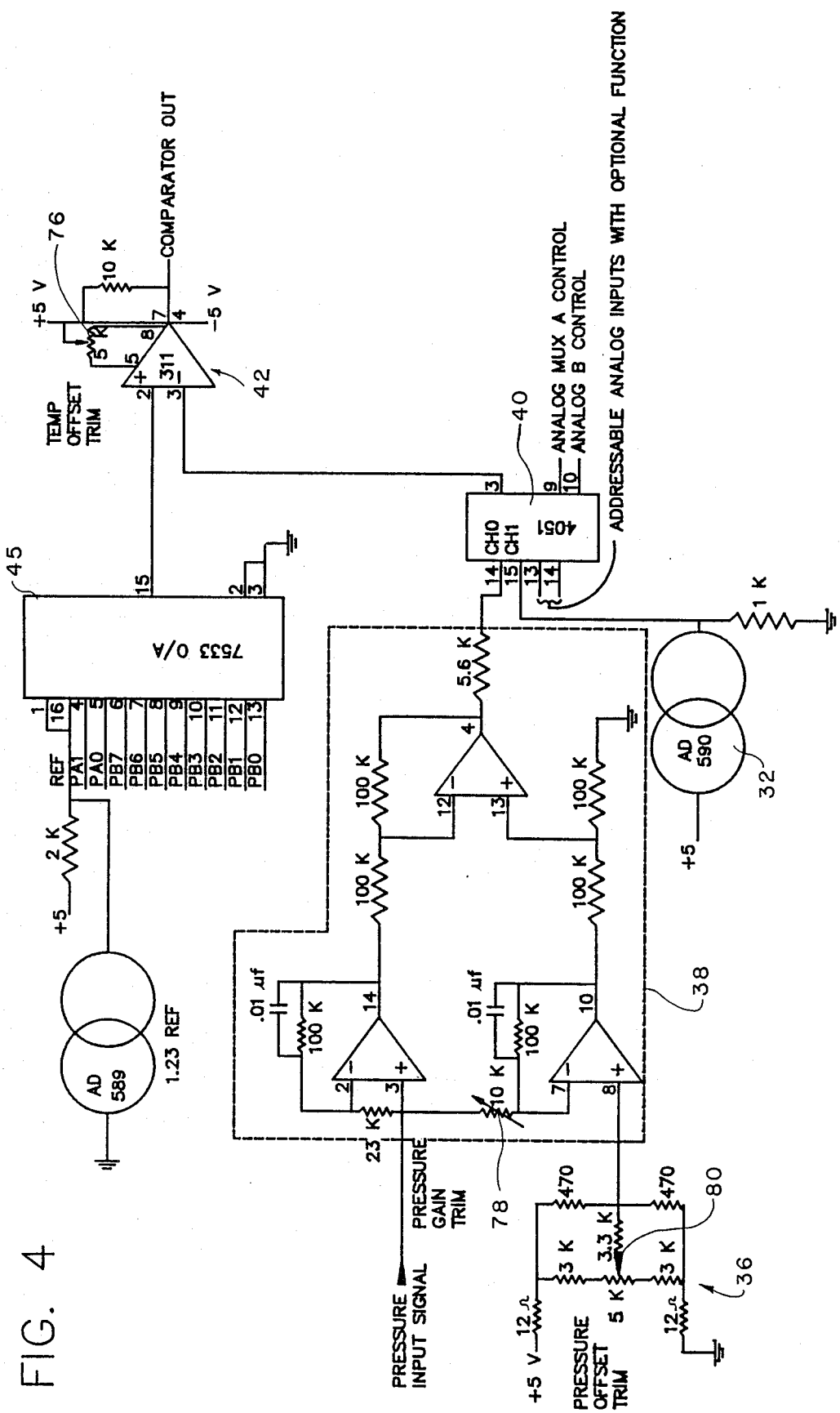
FIG. 4 is a schematic showing signal conditioner and analog to digital logic circuitry for use in the system of the present invention.
Figure 5:
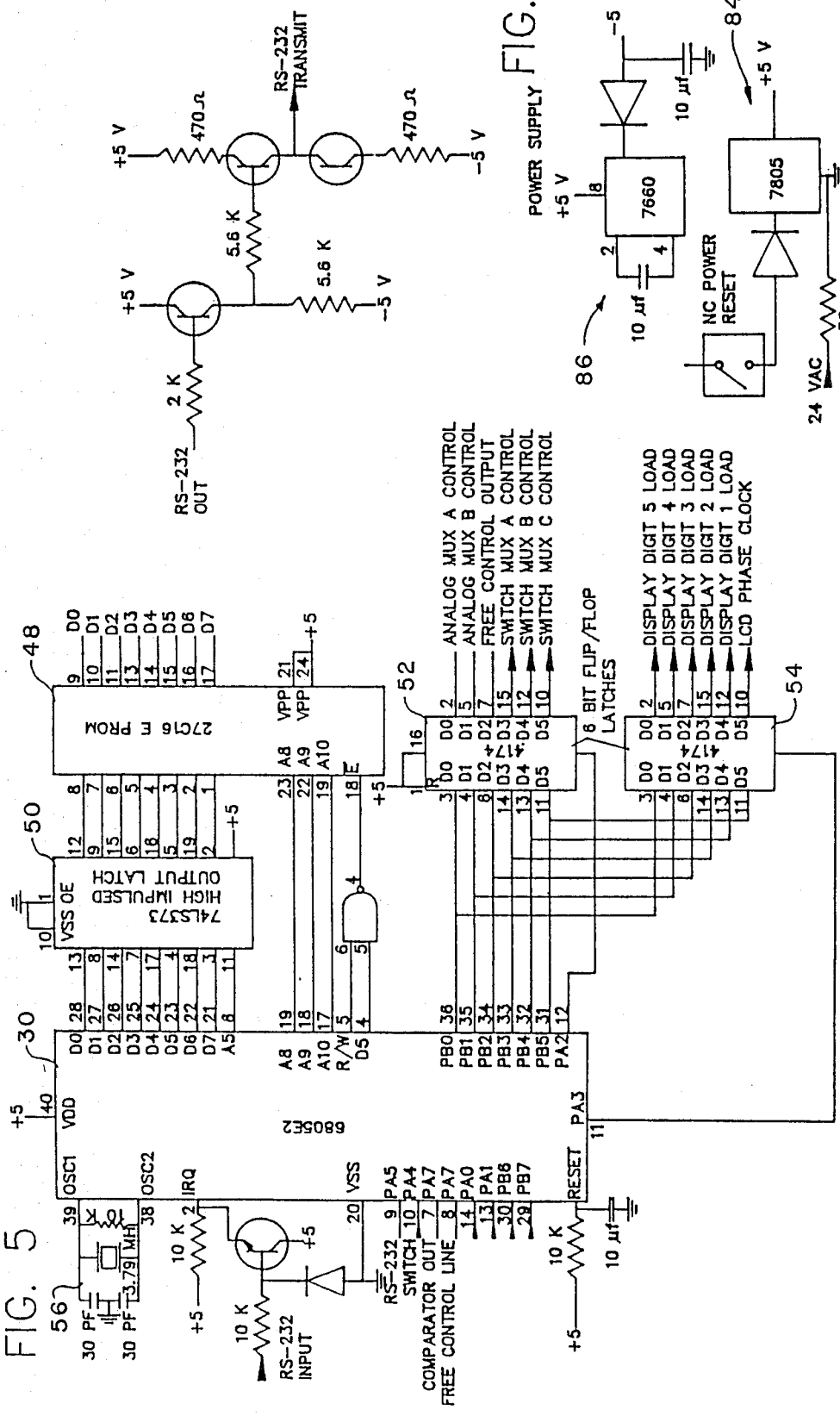
FIG. 5 is a block diagram showing the microprocessor and associated components.
Figure 6:
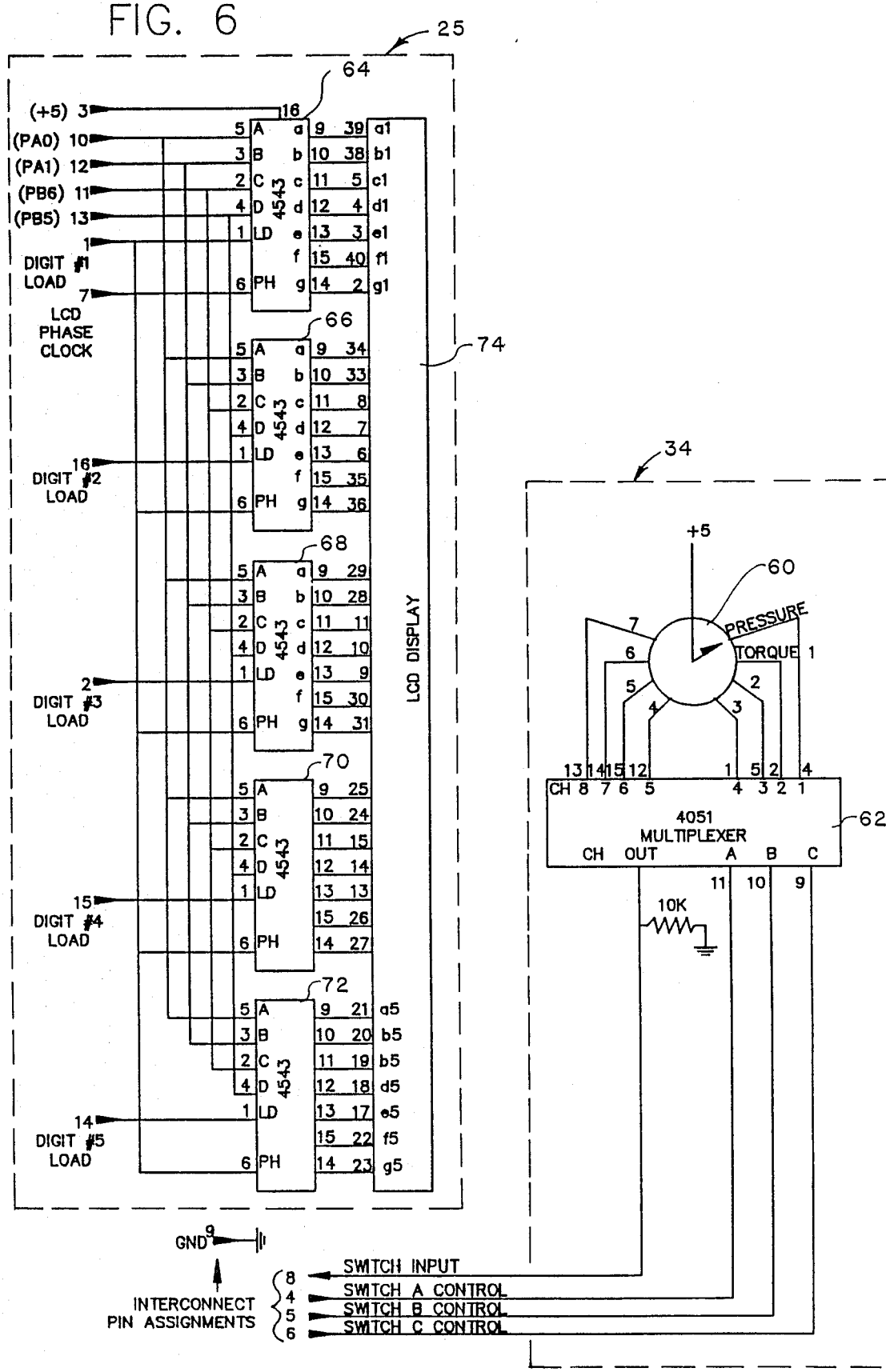
FIG. 6 is a block diagram of the selector switch and LCD display board used in the present invention.

Referring now to a combined consideration of FIGS. 4, 5 and 6, microprocessor 30 is a 6805 CMOS microprocessor that provides for control of LCD display unit 25, and measurement of temperature and pressure. Microprocessor 30 contains 128 bytes of random access memory (RAM) and is interfaced with a 2K 2716 erasable programmable read only memory (EPROM) 48. Measurement and control functions are provided by 16 input/output (I/O) lines that are an integral part of microprocessor 30. The microprocessor system also includes an output latch 50 with tri-state outputs between EPROM 48 and microprocessor 30. Twelve outputs from microprocessor 30 are provided for control using two 6 bit 4174 flip-flop latches 52, 54. Ten of those outputs also interface with 10 bit digital to analog converter 44 (ICL 7533), (see FIG. 4). The system regulates its own power to +5 volts consuming a maximum of 50 ma of current at this voltage. The microprocessor is driven by a 3.79 MH oscillator 56.

Referring particularly to FIG. 4, the pressure signal from gage pressure transducer 26 is delivered to instrumentation amplifier 38. The output from transducer 26 (which is a half bridge transducer) varies from approximately 2.4 to 2.5 mv over a pressure range of from 0 to 10,000 p.s.i. That output is balanced against a pressure offset trim resistance bridge 36, and the difference is taken by amplifier 38. The output from amplifier 38 (which is an analog voltage signal commensurate with wrench operating pressure) is delivered to a 4501 analog multiplexer 40. Multiplexer 40 also receives analog voltage inputs commensurate with pressure transducer temperature from temperature transducer 32. Multiplexer 40 is connected to and receives control signals from microprocessor 30 (on the lines marked Mux A Control and Mux B control). As determined by the software program, microprocessor 30 will signal multiplexer 40 to pass either the pressure input voltage signal or the temperature input voltage signal to comparator 42 (LM311).

The analog voltage signal (pressure or temperature) from multiplexer 40 is determined by comparator 42, the 10 bit digital to analog converter 44, and the microprocessor 30. The conversion is controlled by a software algorithm that applies a binary search of digital voltage values to D/A converter 44 for delivery to comparator 42. When the input from D/A converter 44 to comparator 42 is within 1 bit of the input (i.e., pressure or temperature signal) from multiplexer 40 to comparator 42, the digital value of the pressure or temperature is equivalent to that digital value applied to the D/A converter 44. This informs the microprocessor of the pressure or temperature level by equating it to the voltage level in converter 44 set by the microprocessor.

Upon determining the digital voltage, the system software causes the microprocessor 30 to repeat the comparison process 32 times to obtain an average voltage level of the pressure or temperature signal over 5 milliseconds of time. Then, as an additional filtering step, the software causes 16 repeats of the 5ms (32 readings) step for both temperature and pressure readings prior to the steps of temperature compensation and conversion of pressure readings to torque measurement (both of which are accomplished in the microprocessor under control of the algorithms of the software program).

A multiple position selection switch 60 (see FIG. 6) of switch unit 34 interfaces with microprocessor 30 to compute and display torque for wrenches of different sizes. In the present system, switch 60 is an 8 position switch to be used to display torque readings for 7 different size wrenches (switch torque positions 2–8); and one switch position is used for display of pressure when it is desired to know that parameter. Switch 60 is connected to a 4051 analog switch multiplexer 62. Switch multiplexer 62 receives three TTL digital signals from microprocessor 30 (Switch A Control, Switch B Control, Switch C Control) at inputs marked A, B and C, respectively. All of the positions of switch 60 are connected to one of eight input channels of multiplexer 62, the output of which, in turn, is connected to the "Switch Input" pin on microprocessor 30. Each individual switch position (positions 1–8) of switch 60 is connected to the channel "OUT" by a different binary code on the pins A, B, C of multiplexer 62 from the microprocessor, thus providing eight switch position indicators. Microprocessor 30 interrogates switch multiplexer 62 at the rate of 25 times per second to determine the position at which rotary switch 60 is set. Under the control of the software program, calibration or conversion coefficients are applied to the pressure signals to convert them to torque values, which are then displayed on the LCD display system.

As shown in FIG. 5, latch 52 interfaces microprocessor 30 with multiplexer 40 via the lines marked Analog Mux A Control and Analog Mux B Control; and latch 52 also interfaces the microprocessor with switch multiplexer 62 via the lines marked Switch Mux A Control, Switch Mux B Control and Switch Mux C Control. Similarly, latch 54 interfaces microprocessor 30 with the 5 display drivers 64–72 of digital display unit 25 via the Display Digit Load Lines 1–5.

Referring to FIG. 5A, the power supply to the system is shown. Voltage regulator 84 provides voltage regulation to +5V. Voltage regulator 86 provides precision voltage regulation to −5 volts for comparator 42.

Referring to FIG. 6, microprocessor 30 is connected through 5 4543 display drivers 64–72 to an LCD display 74 of display unit 25. The drivers 64–72 convert BCD outputs from microprocessor 30 to the 7 segments comprising each digit to be displayed. A clock generated by timed interrupts within the microprocessor system (from pin 10 on latch 54) is used to generate an AC clock to the LCD display to prevent burn-in of digits on the LCD. All other tasks in the system are also scheduled by interrupts generated by this 25 Hz clock. The output to LCD 74 is updated every 16 interrupts (about 0.6 seconds) under control of the program software.

It should be noted that the system of the present invention also simplifies and makes more accurate the preset operation whereby pressure relief valve is adjusted to set the maximum operating pressure of the system. In the present system, the operator sees the pressure level digitally displayed in real time as he sets valve 20. Furthermore, the operator can accurately set valve 20 to a desired level rather than being limited to the cardinal points on a gage.

The digital torque readout (DTR) system of the present invention should be calibrated for pressure and temperature before initial operation or if there is reason to believe the temperature or pressure transducer has drifted.

Calibration is effected by selection of a special operating mode (under control of the microprocessor and the system software) through selector switch 60. Microprocessor 30 is powered, whereupon display 74 will show an array of 5 digits of 8. Selector switch 60 is then cycled from position 1 to position 2 and back to position 1. Selector position 1 will then display pressure and position 6 (torque position 5) will display the temperature correction factor multiplied by 256.

Temperature calibration is effected first with switch 60 in position 6, at which the temperature will be displayed on LCD 74, with 256 being equivalent to 75° F. room temperature. Temperature calibration is then carried out by adjusting a potentiometer 76 in the circuit of comparator 42 until the temperature reading is 256 (75° F., i.e., standard "room temperature"). Thereafter, during normal operation of the system, temperature transducer 32 compensates for operating temperatures different from 75° F.

After temperature calibration is done, the system is calibrated for pressure. To effect pressure calibration, the linear behavior of pressure transducer 26 must be matched to a calibrated pressure gage.

The offset and gain of each individual transducer is adjusted by potentiometers 80 and 78, respectively, until the linear behavior of the transducer is within 2% of the actual pressure.

The DTR system of the present invention is controlled by microprocessor 30 and the software program in EPROM 48. Much of the program and its operation have been described in the course of the foregoing description. The entire program stored in EPROM 48 is set forth in Table 1 below (attached hereto as an appendix). The program of Table 1 has five columns. (Column (1) is a 4 digit hexadecimal machine code representation of columns (3) and (4); column (3) shows the operand or op code; column (4) shows the argument; column (5) lists remarks briefly explaining the nature of the operation being carried out. Those skilled in the art will find the program listed in Table I to be a complete and precise description of each step carried out in the program of the present invention. Accordingly, for purposes of clarity and brevity, only the major operations carried out by the program will be described in general terms (in addition to the program description already given in the foregoing discussion of hardware and operation).

Figure 3B:
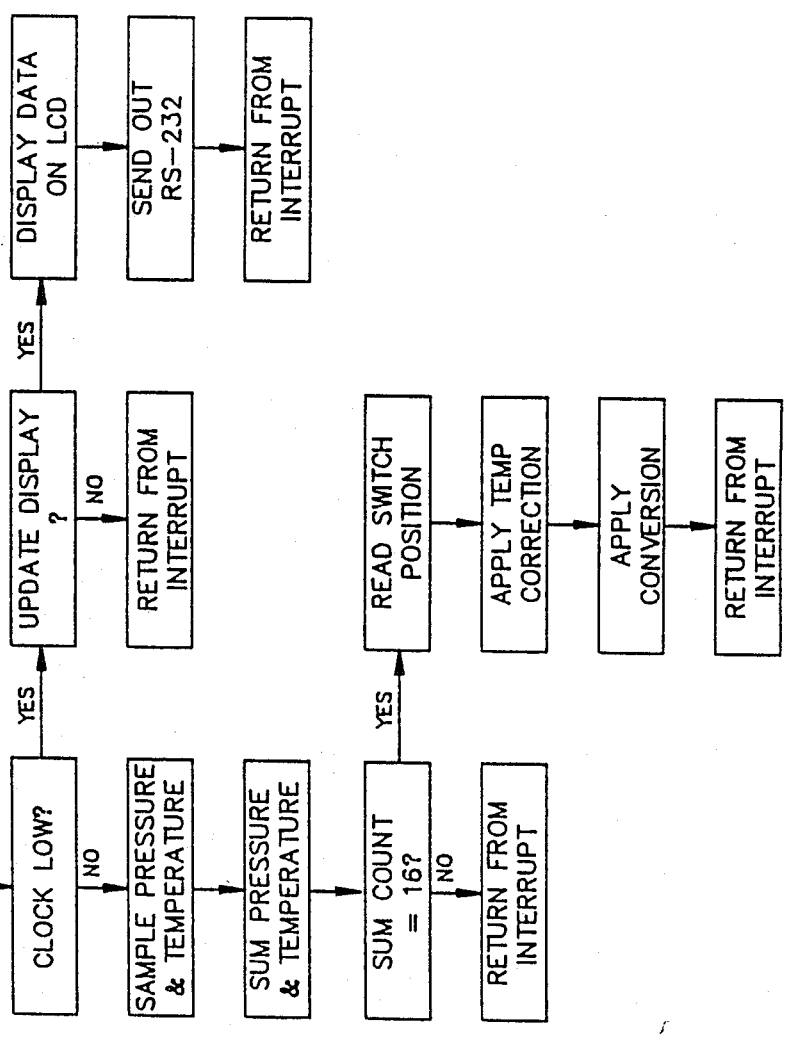
FIGS. 3A and 3B show a flow chart of the microprocessor or computer program for the digital torque readout system of the present invention.
Figure 3A:
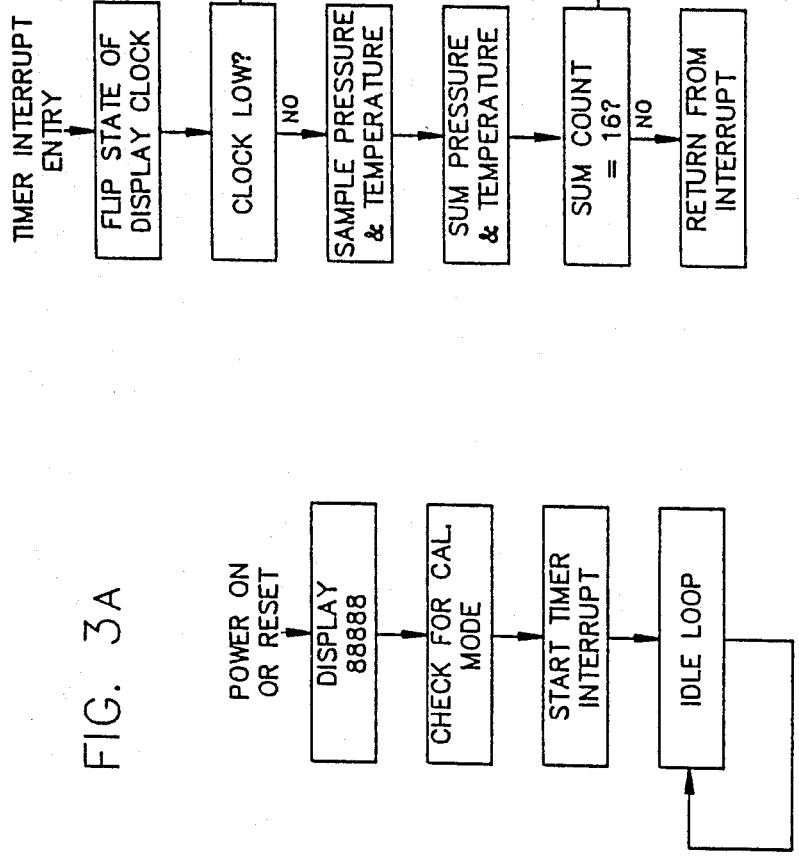

Referring to FIGS. 3A and 3B, a flow chart of the principal features of the program are shown. FIG. 3A shows the program for processor initialization and calibration. FIG. 3B shows the main operating program.

Referring first to FIG. 3A, on powering up the system, a display of five 8 digits appears on display 74. Then, the program checks to see if the calibration mode has been initiated. The 25 Hz timer interrupt clock is started and goes to an idle hoop if the calibration mode has been initiated.

If the calibration mode has not been initiated, a timer interrupt signal is delivered to flip the state of the display clock. If the clock is high, the program directs the microprocessor to determine the pressure and temperature readings (this is done 32 times); and an attempt is made to repeat for 16 times the 32 readings of pressure and temperature. The 16 repeats are synchronized to the timer interrupt signal. After the 16th reading, the microprocessor reads the position of selector switch 60, then temperature correction is applied to the pressure reading, and the pressure is converted to torque per the conversion algorithm in the program.

If the clock is low and after the 16th reading, a signal is delivered to update the LCD display. After the 16th reading, a signal is delivered to update the display before receipt of a timer interrupt signal, inputs are delivered to update the display on the display 74. If an external computer is connected to the system, signals may also be delivered to it when the display is updated. As described previously, the main part of the program is interrupt driven by the 25 Hz clock in the system.

Those skilled in the art will understand that the present invention presents a unique method and apparatus for determining actual torque being applied to a fastening element by a powered wrench. The torque is determined in real time and presented as a ditigal display. This invention overcomes problems of long standing and meets a long felt need in the art. Furthermore, this invention simplifies operation of power wrenches, improves their accuracy and reliability, and eliminates serious sources of error in the prior art.

By providing for direct digital readout of torque, the present invention overcomes the several previously discussed problems of the prior art associated with the use of pressure gage readouts.

The embodiment of FIGS. 7–14L presents a system for automatic cycling of wrench operation and termination of wrench operation when a predetermined torque has been imposed on a fastener element.

Figure 7:
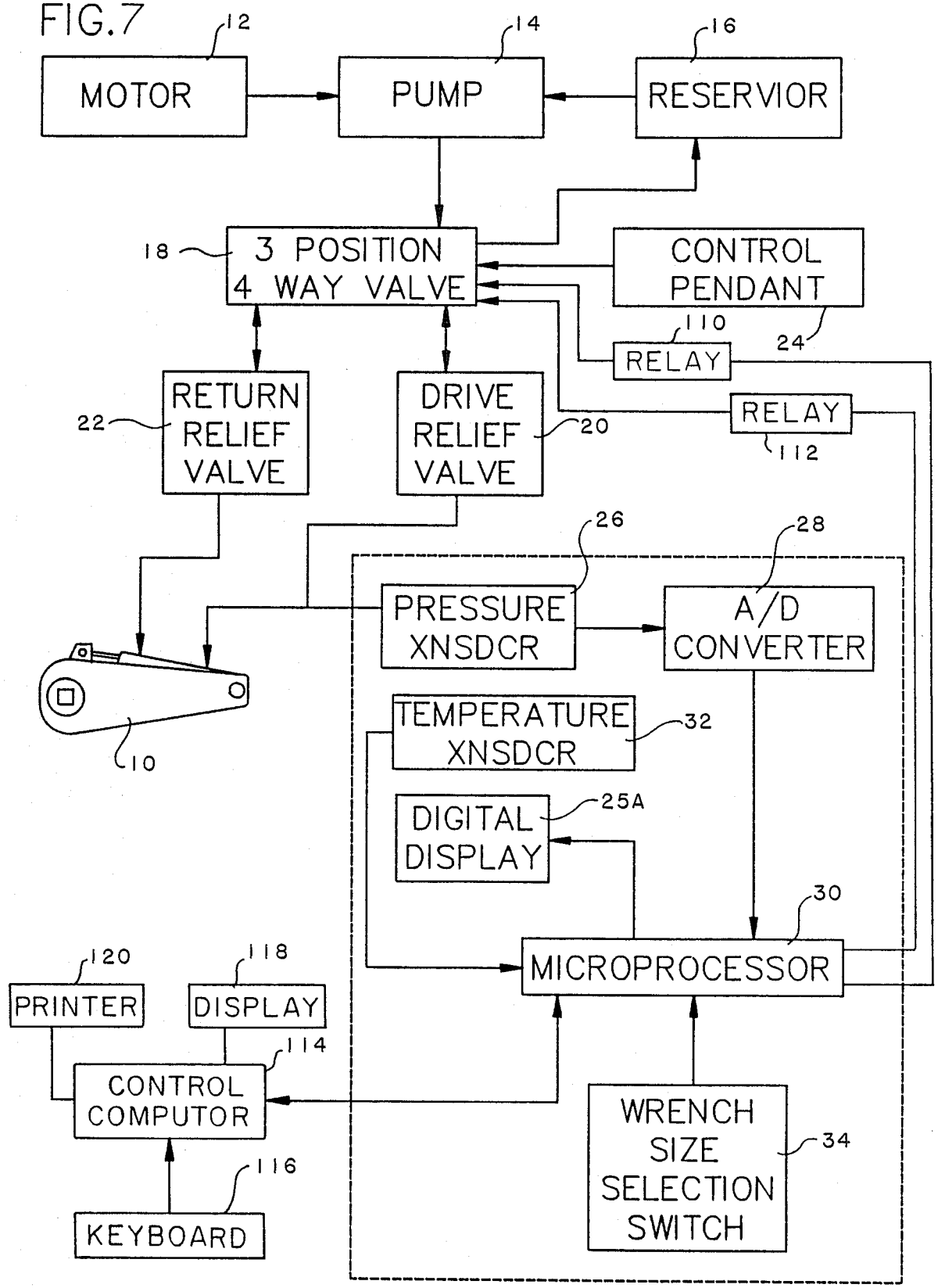
FIG. 7 is a version of the block diagram of FIG. 1 modified for the automatic cycling and termination of the present invention.
Figure 8:
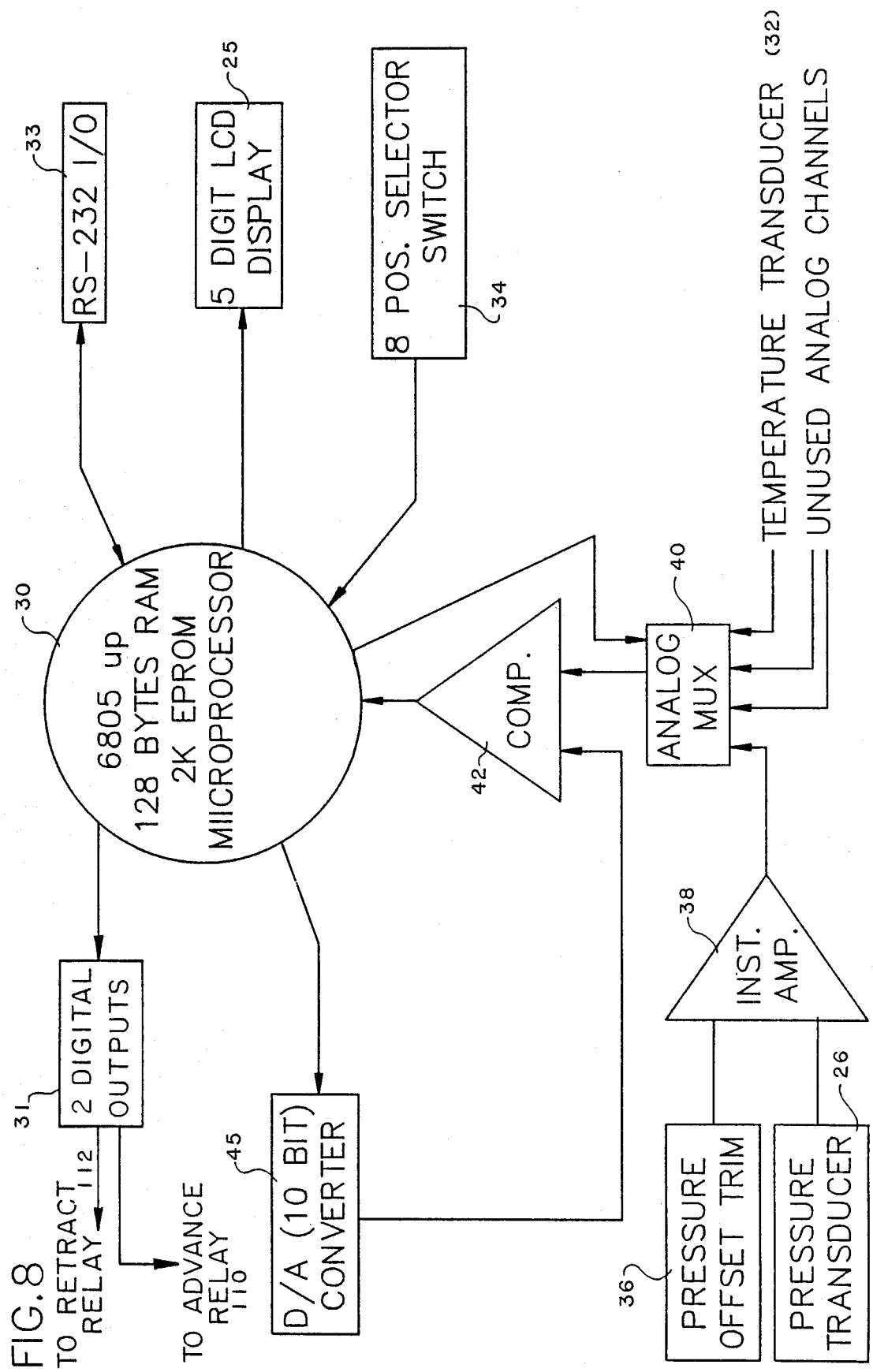
FIG. 8 is a version of the functional diagram of FIG. 2 modified for the automatic cycling and termination of the present invention.

From a system standpoint the automatic cycling and shut off embodiment involves the addition of several components to the block diagram of FIG.1. The modified system is shown in FIG. 7 and includes an advance relay 110 and a retract relay 112 in lines between microprocessor 30 and three position four-way valve 18. A signal from microprocessor 30 to close advance relay 110 will result in valve 18 being positioned to deliver hydraulic fluid to drive or advance wrench 10, and a signal from the microprocessor to open relay 110 will result in valve 18 being positioned in its null or recirculating position where the fluid from pump 14 is returned to reservoir 16. Similarly, a signal from the microprocessor to close retract valve 112 will result in valve 18 being positioned to deliver hydraulic fluid to retract wrench 10, and a signal from the microprocessor to open relay 112 will put valve 18 in its null or recirculating position. The modified system also includes a control computer 114 which communicates with microprocessor 30, a keyboard 116 for inputting data to control computer 114 and a display 118 associated with control computer 114. A printer 120 may be included to provide a permanent record of the history of tightening of the fastener. As shown in FIG. 8, the functional diagram of FIG. 2 is also modified by connecting the two digital outputs from 31 to advance relay 110 and retract relay 112. Also, with reference to FIG. 10 (which is the modified block diagram of FIG. 5), advance relay 112 is connected to pin 8 of microprocessor 30, retract relay 110 is connected to pin 7 of latch 52, and control computer 114 is connected to RS-232 out (33(O)) for delivery of signals from microprocessor 30 to control computer 114 and to RS-232 input (33 (I)) for delivery of signals from control computer 114 to microprocessor 30.

Computer 114 may, e.g. be a programmable Epson Model HX 20 computer, or it may be a programmable hand held unit which may also incorporate the control pendant 24 into a single housing.

Referring to FIGS. 7 and 8, the desired torque level to be delivered to a fastener is inputted to computer 114 via keyboard 116 by an operator. The operator selects a torque level which control computer 114 converts to a pressure level (for the selected wrench), and which in turn is converted to an advance cycle interrupt voltage level which is communicated to microprocessor 30. Control computer 114 communicates with microprocessor 30 to operate advance and retract relays 110 and 112 to cycle valve 18 and, hence, cycle wrench 10. In the operation of the system of FIG. 7, drive relief valve 20 is set to its maximum level, so valve 20 is effectively out of the system and maximum operating hydraulic pressure is controlled by pressure transducer 26, microprocessor 30, computer 114 and relays 110 and 112. Of course, it will be understood that microprocessor 30 could be incorporated into control computer 14.

In the system of FIGS. 7-14L, the setting of a torque level in computer 114 will, through the system software and microprocessor 30, deliver a signal to close advance relay 110 to position valve 18 to deliver pressurized fluid to advance wrench 10 (which is mounted on an element to be fastened) to tighten a fastener. As wrench 10 advances in its operating stroke, pressure transducer 26 senses the increasing pressure in wrench 22 as the fastener is tightened. When the wrench bottoms out at the end of any stroke (prior to the final stroke), there is a large and rapid increase in pressure which is sensed by transducer 26 and delivered (via comparator 42) as a digital signal to microprocessor 30. Instead of displaying the pressure level (as determined by comparator 42) as in the previous embodiment, microprocessor 30 is programmed to compare the sensed pressure level (a voltage level) with the advance cycle interrupt voltage level signal from control computer 114. When the sensed pressure level exceeds the maximum selected pressure (for the desired torque) microprocessor 30 then opens advance relay 110 to place valve 18 in the null position. As described hereinafter, the increase in pressure is, through the system software, recognized as the end of a stroke by computer 114. When that happens, computer 114 makes a decision to recycle, which causes microprocessor 30 to signal retract relay 112 to close and thus position valve 18 to deliver pressurized fluid to retract wrench 10. After a predetermined time lapse, signals from microprocessor 30 then open retract relay 112 and close advance relay 110 to position valve 18 to again deliver pressurized fluid to wrench 10 to again advance the wrench to tighten the fastener. This cycling is repeated until computer 114, through the system of software, determines that the fastener has been tightened to the desired torque. Then, computer 114 will terminate operation of the system; and display 118 will show that the desired torque level has been reached; and a permanent record of the history of tightening of the fastener is obtained from the printer 120.

It will be understood that the system may be operated in the measurement and display mode of FIGS. 1–6 or in the automatic cycling and cut-off mode of FIGS. 7–14L. In the former mode, computer 114, keyboard 116, display 118, printer 120 and relays 110 and 112 will be inoperative and wrench selection switch 34 and display 25 will be operative. In the latter mode, wrench size selection switch 34 and display 25 are inoperative, relays 110 and 112 are operative, the display is on display 118, and wrench size selection, torque level and historical information for documentation (such as date, bolt number, operator identification, joint designation) are inputted to computer 114 via keyboard 116. The automatic cycling and cut-off system can also be operated in what may be called a semi-automatic mode where the operator manually initiates each advance and retract stroke by inputting commands to keyboard 116. This semi-automatic mode provides a way to override the fully automatic system if that is desirsed.

The automatic cycling and cut off system (and also the semi-automatic or manual version thereof) is controlled by microprocessor 30, its software program (in EPROM 48), control computer 114 and its software program. Much of the programs and their operation have or will be described herein in the course of describing the operation of the system. The modified program stored in EPROM 48 for the automatic (and semi-automatic) system is set forth in Table II below (attached hereto as an appendix) and is set forth in the same format as Table I. The entire program stored in control computer 114 is set forth in Table III in BASIC. Those skilled in the art will find the programs of Tables II and III and the flow charts of FIGS. 9A-9D and 14A-14L to be a complete and precise description of each step carried out in the program of the present invention. Accordingly, for purposes of clarity and brevity only the major operation carried out by the programs will be described in general terms.

Referring to a joint consideration of FIGS. 9A-9D (with reference also to FIG. 10), the flow chart for the program of microprocessor 30 is shown for the automatic cycling and termination mode of operation. On powering up the system (shown in FIG. 9A), the operation is as described with respect to FIG. 3A, with the additional step that signals are delivered from microprocessor 30 to open advance and retract relays 110 and 112, whereby valve 18 is in its null or recirculating position. In that position of valve 18, all fluid from pump 14 is recirculated to reservoir 16 and no fluid is delivered to wrench 10. As with the system of FIG. 3A, after checking for calibration mode, a signal is delivered to flip the state of the delay clock; and, if the clock is high the program directs microprocessor 30 to determine pressure and temperature readings (32 times repeated 16 times). If the clock is low and after the 16th reading, microprocessor 30 interrogates the input 33(I) on pin 2 (see FIG. 10) to see if there is an input (RS-232 interrupt signal) from computer 114. If there is no input 33(I), the system will operate in the display mode to display on LCD 25. If there is an input 33(I) from computer 114 (as there will be if the system is being operated in the automatic cycling mode), the program shown in FIGS. 9C and 9D, which is incorporated in the program for microprocessor 30 in EPROM 48, controls the operation of the microprocessor 30.

Figure 9B:
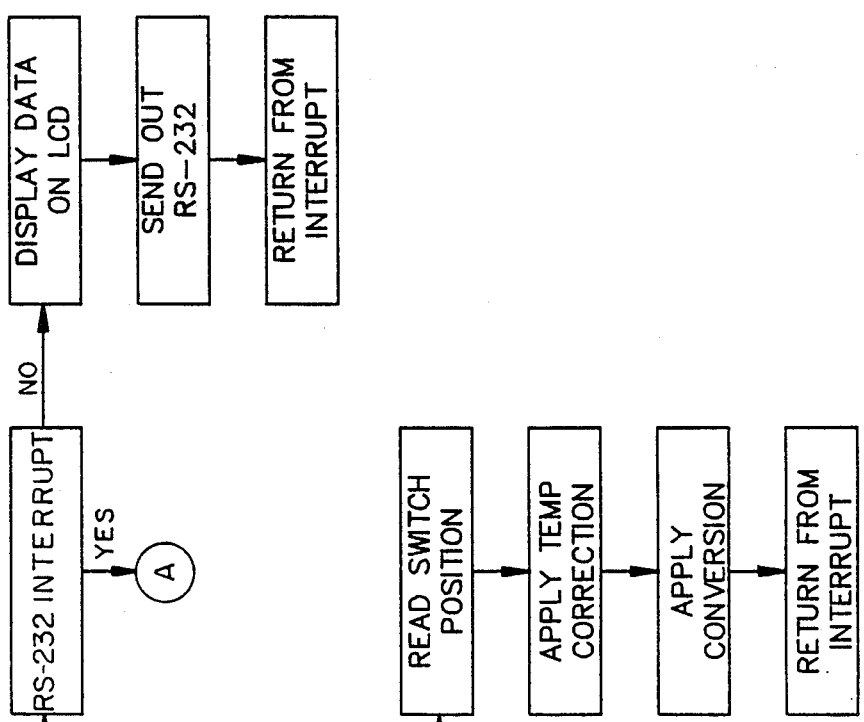
FIG. 9B is a version of the flow chart of FIG. 3B modified for the automatic cycling and termination of the present invention.
Figure 9A:
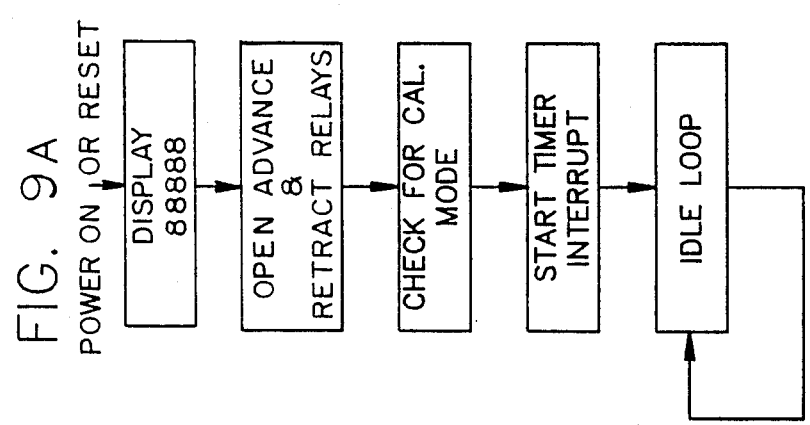
FIG. 9A is a version of the functional diagram of FIG. 3A modified for the automatic cycling and termination of the present invention.
Figure 9C:
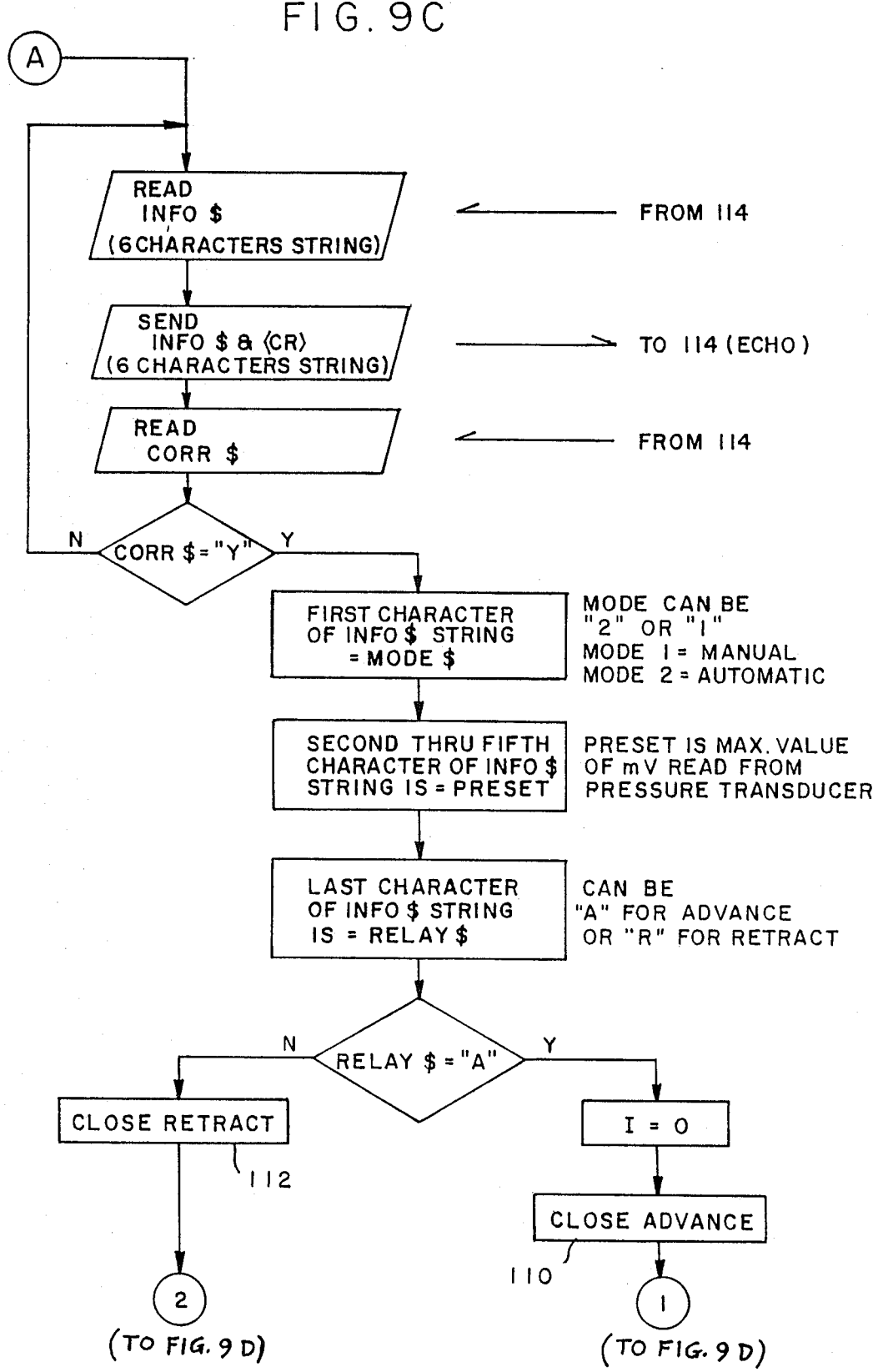

Referring to FIG. 9C, microprocessor 30 reads an information string sent to it from control computer 114. Microprocessor 30 then sends (echoes) that information string back to control computer 114 to verify that the information string is correct. If microprocessor 30 has received the correct information string, that is confirmed by another input from control computer 114. If the information was not correct, the cycle is repeated. If the information is correct, then microprocessor 30 examines the information string. The first character determines whether the system is being operated manually (i.e., semi-automatically) (mode 1) or automatically (mode 2); the 2nd–5th characters give the microprocessor 30 the desired cut off pressure level in millivolts; and the last character identifies which relay (110 or 112) is to be closed. Depending on the last character, the ADVANCE or RETRACT cycle will be operated.

Referring to FIG. 9D, and if the system is operating automatically, if the RETRACT cycle is operated, relay 112 is closed to position valve 18 to initiate the retract operation of the wrench. The, microprocessor 30 looks for the next signal (any character) from computer 114, which is time delayed by computer 114. When that next signal appears, microprocessor 30 opens retract relay 112 to terminate the retract cycle. Microprocessor 30 then sends a check character to computer 114 to confirm that the retract operation is complete. The cycle then returns to Start Timer Interrupt (FIG. 9A).

Still referring to FIG. 9D (and still with the system operating on automatic), fi the ADVANCE cycle is operated, a reading counter in the memory (I) which counts the number of pressure signals from transducer 32 is set to "0" and relay 110 is closed to position valve 18 to initiate the advance stroke of the wrench. Microprocessor 30 then reads the signal from pressure transducer 26 (temperature compensated in the microprocessor) by the same logic process previously described with respect to FIG. 3B for the clock high situation. Microprocessor 30 then checks to determine whether the system is being operated in the automatic or manual (semi-automatic) modes. With the system in the automatic mode, if the reading counter (I) is not greater than 0 (i.e., no pressure (mmv) readings have yet been counted) and if the pressure sensed by transducer 26 is not greater than 0, the reading counter I is not incremented. Then a rolling storage in the memory stores the last 20 readings from the transducer 26. If any signal is received from computer 114 (e.g., an emergency stop), the system shuts down. Otherwise, the cycle is repeated (at (5)). On this recycling I will have been incremented; and when the reading from pressure transducer 26 exceeds the preset value (as inputted to computer 114 through keyboard 116), advance relay 110 will be opened to change the position of valve 18 and terminate the advance stroke of wrench 10. Microprocessor 30 then looks again to see whether the system is in manual (semi-automatic) (1) or automatic (2) mode. If in the automatic mode, the last 20 readings of transducer 26 and the reading count I are sent to control computer 114 and the cycle then returns to Start Timer Interrupt (FIG. 9A) for the next cycle of operation of the system to be initiated by controller 114 (which will be a retract cycle unless the desired level of torque has been applied to the fastener element).

If the system is operated in the manual (i.e., semi-automatic) mode, the operator initiates the advance stroke though keyboard 116; the microprocessor automatically terminates the advance stroke when the pressure sensed by transducer 26 exceeds the preset pressure; display 118 tells the operator to recycle and the operator initiates the retract stroke through keyboard 116; and the retract stroke is automatically terminated after a predetermined time period; and the wrench bottomed out and the desired advance cycle is repeated.

Figure 11:
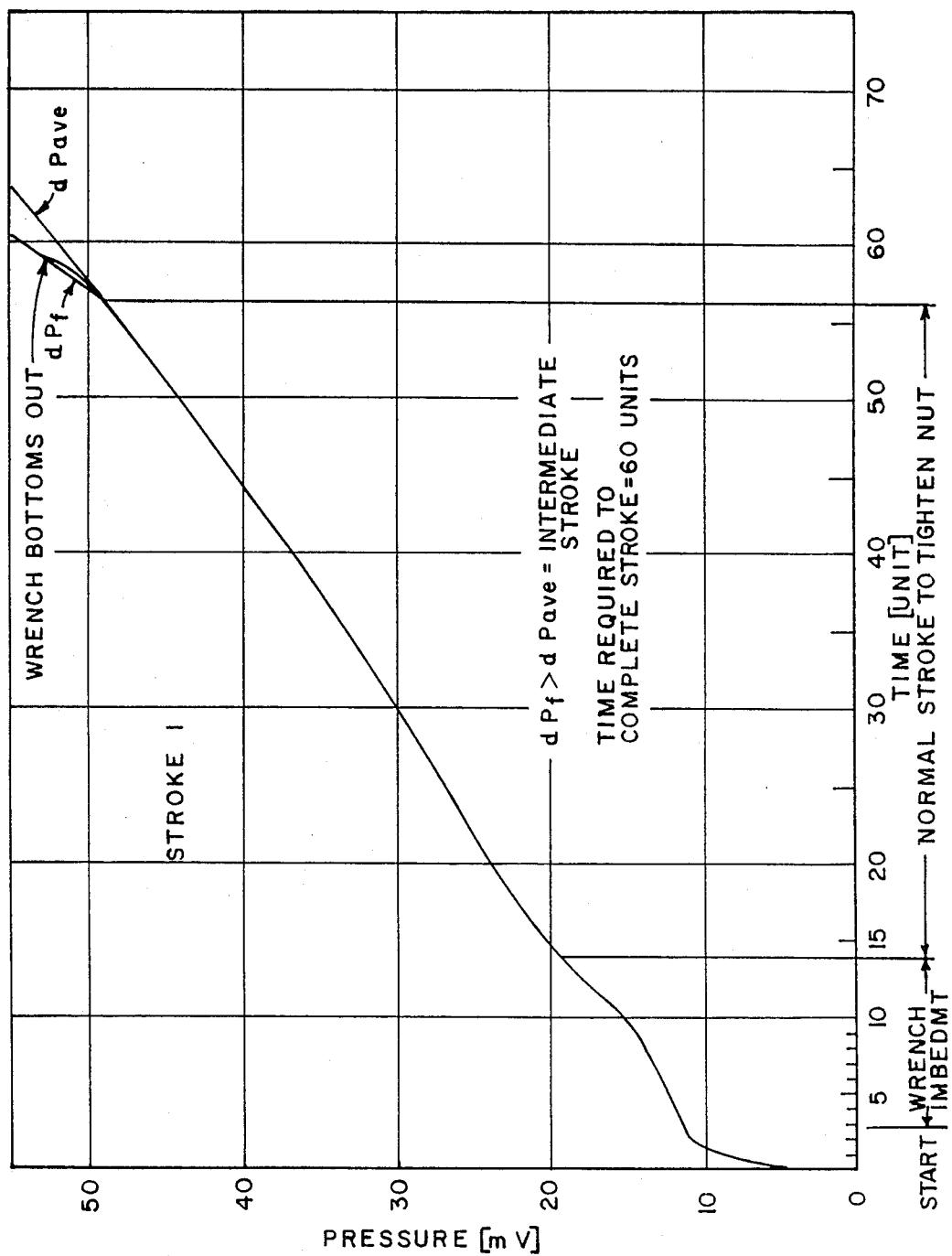

The automatic cycling torque control system uses an algorithm developed from FIGS. 11-13 to determine the status of the tightening cycle. As shown in FIGS. 11-13, three conditions are possible when the wrench is operated in the advance mode: (1) It is possible that the wrench is in an intermediate stroke, i.e., the wrench bottomed out and the desired preset torque value has not yet been applied to the fastener (shown in FIG. 11); (2) The wrench has experienced its final stroke, i.e., the preset torque value has been applied to the fastener (shown in FIG. 13; (3) The wrench did not cycle properly, i.e., no ratcheting occured (FIG. 12).

FIG. 11 shows a plot of wrench operation for a normal intermediate cycle of operation, i.e., prior to the preset torque level being reached. FIG. 11 is a plot of the fluid pressure in the wrench vs time. The pressure rise as the wrench is advanced is plotted, and the slope of that line, which is the rate of change of pressure with time, is indicated as dPave. When the wrench bottoms out, the pressure increases considerably in a short period of time as the fluid pressure builds up against the cylinder wall. That higher rate of pressure increase is indicated as $dP_f$. The condition of $dP_f$ (over the last 10 data points) being greater than dPave over a set period of time units (e.g., 60 units) means that the wrench has completed an intermediate stroke, the final fastener torque level has not yet been reached, and the wrench should be recycled. In the automatic system, recycling would be automatic. In the semi-automatic system, the operator must observe for himself that the wrench has bottomed out and the operator must manually operate the keyboard to retract and recyle the wrench; or the operator must visually determine that the wrench is in mid-stroke and thus has reached the cut-off torque level.

Referring to FIG. 12, $dP_f$ is greater that dPave, but the time required to complete the stroke is less than 90% of the time required for the prior stroke (e.g., a FIG. 11 stroke). This means that the stroke is a no ratchet stroke, and the operator will be signaled, e.g. by audio or visual means, to correct wrench mounting and/or retract and recycle the wrench.

Referring to FIG 13, $dP_f$ (for the last 10 data points) is less than dPave. This means that the predetermined torque level been applied to the fastener and that transducer 26 has sensed the cut-off pressure level, thus resulting in opening advance relay 110 to end the flow of pressurized fluid to the wrench. The predetermined torque level has been reached, and display 118 signals the operator to move the wrench to the next fastener to be tightened.

The flow chart for the program for controller computer 114 (Epson HX 20) is shown in FIGS. 14A-14L, and the program is set forth in Table III. As shown in FIGS. 14A-14D, the control computer 114 begins the wrench cycling routine by cueing the operator through display 118 for the pertinent job information and the torque to be applied to the fastener. The operator then inputs through keyboard 116 the pertinent data such as wrench size, torque level, and historical data. If the torque inputted by the operator is larger than the output available from the wrench specified by the operator, the computer will signal the operator on display 118 and request a new wrench or torque parameter. The controller calculates the wrench fluid pressure necessary to achieve the torque selected by the operator and then calculates the millivolt equivalent for the torque.

Figure 14A:
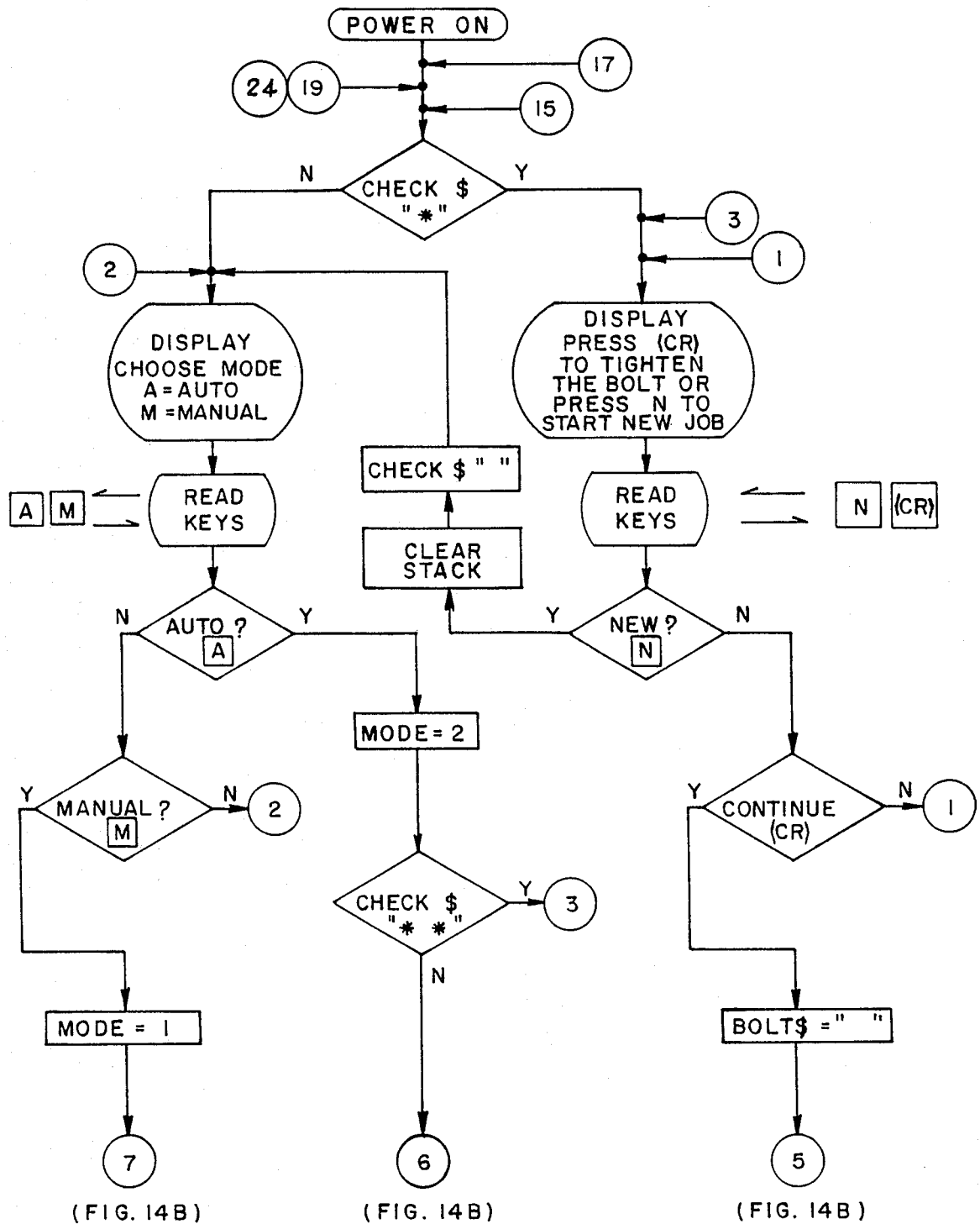
FIGS. 14A-14(L) are flow charts of the microprocessor or computer program for the control computer for automatic cycling and termination.
Figure 14D:
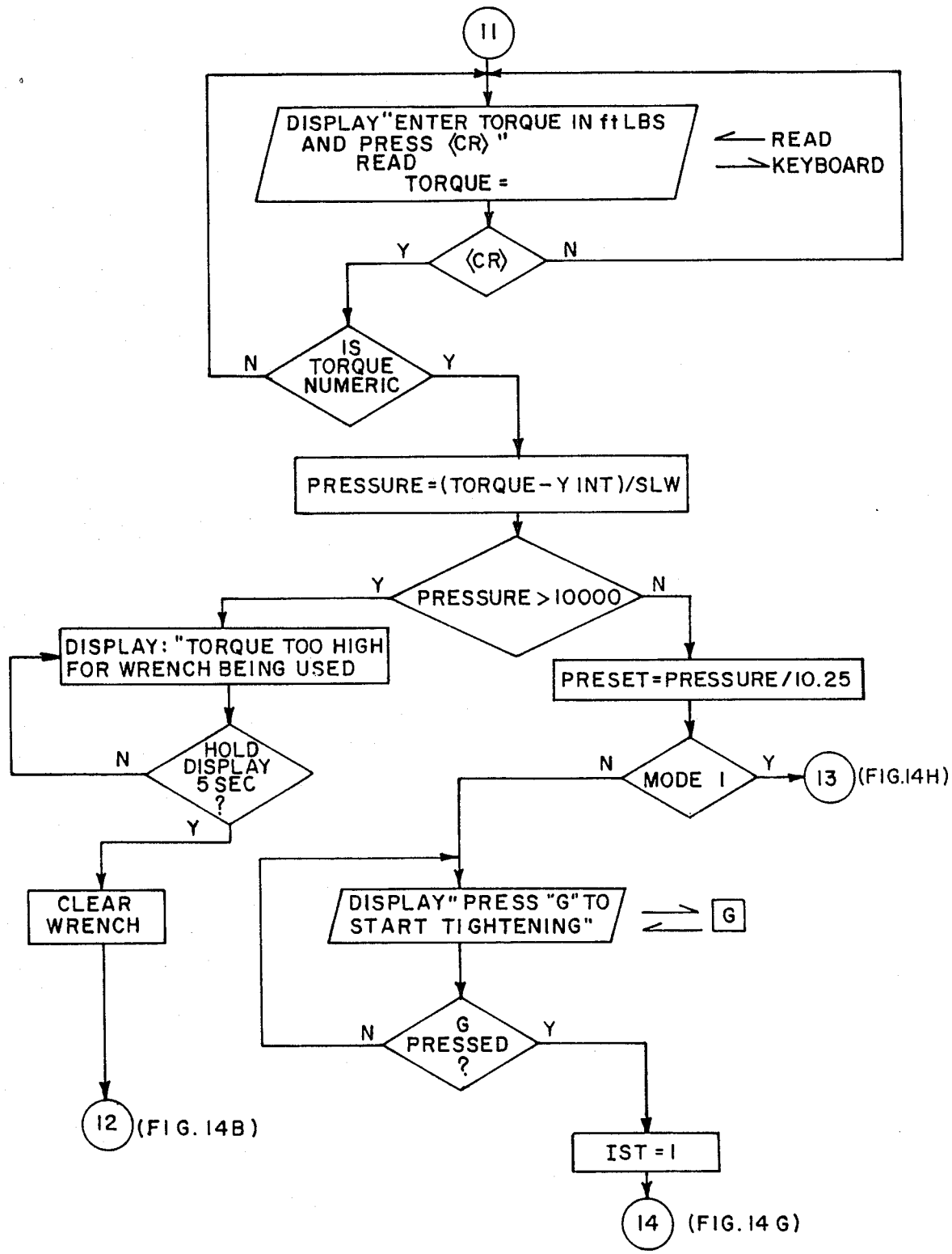

The operator then presses the "go" (G) key to initiate operation (see FIG. 14D). The G key is a dead man's switch; it must be manually pressed during all cycling of the wrench; and wrench cycling will stop if the key is released. After pressing the "go" key, the data is assembled by computer 114 with a mode designation character and a relay designation character; and the controller 114 sends these characters to microprocessor (30) (See Communication Subroutine FIGS. 14 J,K). The mode designates between automatic cycling (mode 2) and manual cycling (mode 1) as determined by operator input.

The relay designation character signals microprocessor (30) to close the advance (110) or retract (112) relay.

Figure 14E:
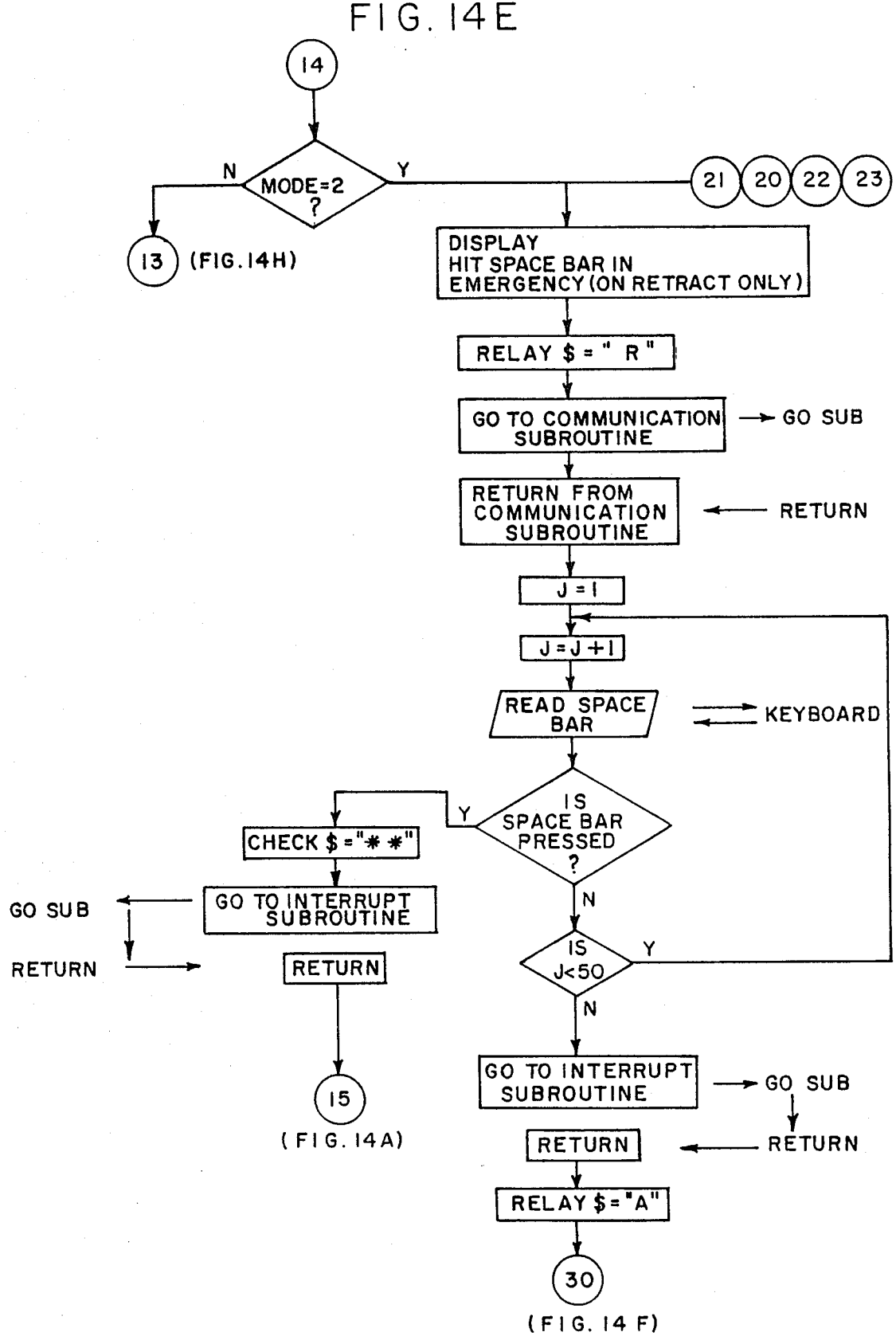
Figure 14:
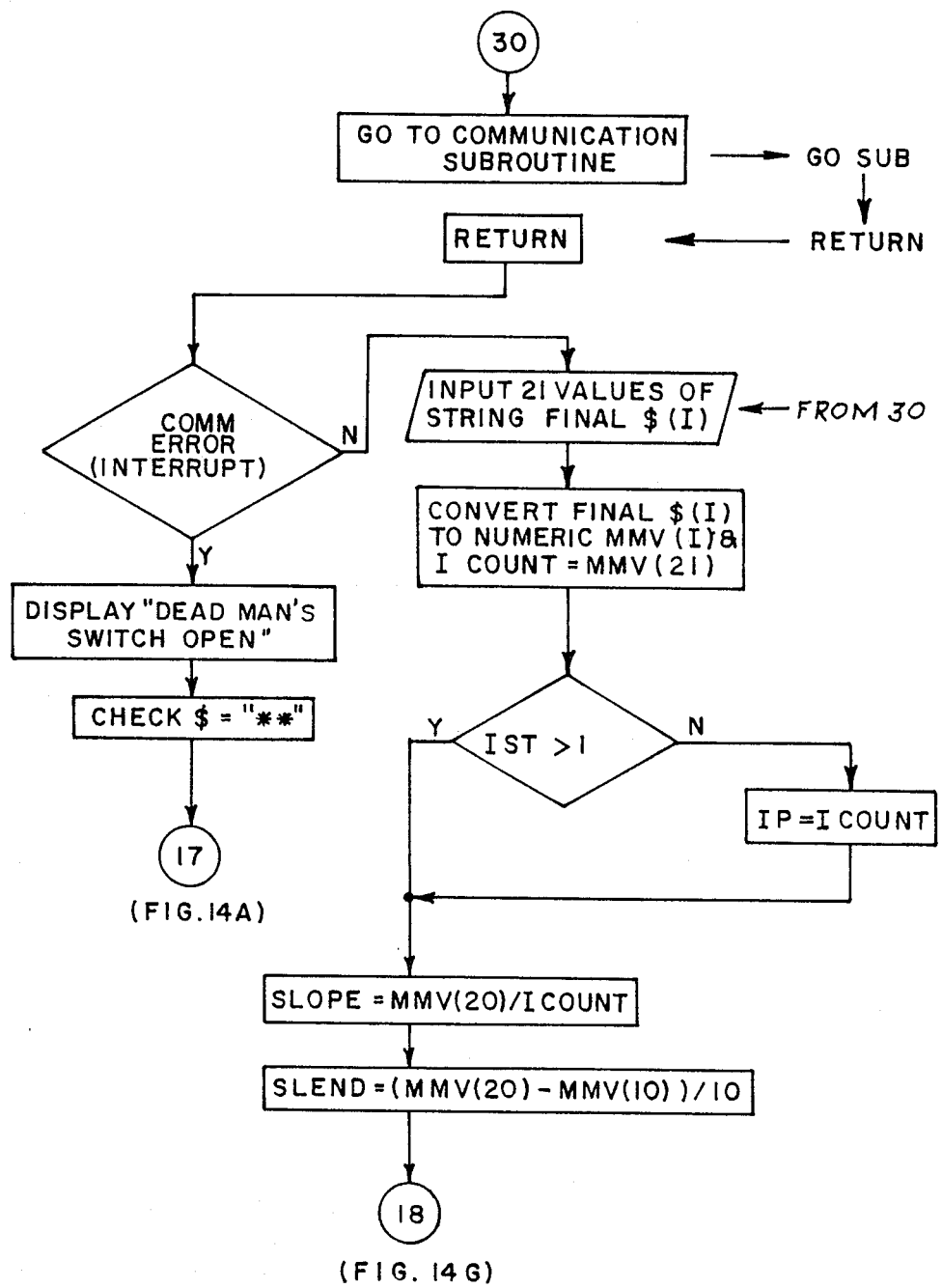
Figure 14G:
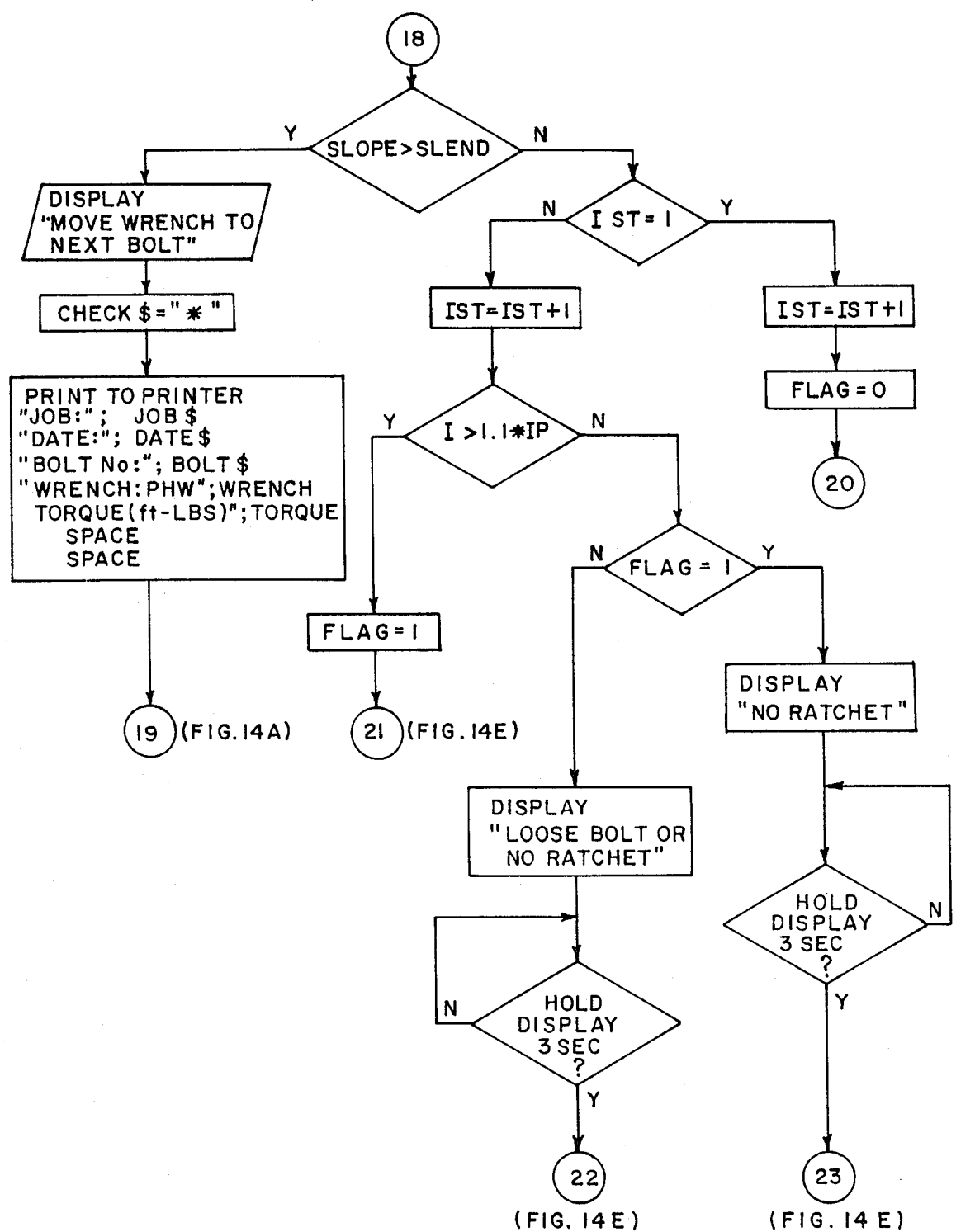

Referring to FIG. 14E, the program makes sure that the wrench is retracted (Relay $=R). The program then counts the time period J to complete the retract stroke and then goes to the Interrupt Subroutine (FIG. 14I) to signal microprocessor 30 to terminate the retract stroke. The program then returns to close the advance relay (FIG. 14E). The program goes through the Communication Subroutine (FIGS. 14J,K) again to assemble the communication string with the mode designation, preset pressure level and relay designation character in control computer 114. This information string is then communicated to microprocessor 30 from control computer 114 to cause microprocessor 30 to close the advance relay and start the tightenting cycle of the wrench. For the advance stroke microprocessor 30 closes the advance relay and monitors the pressure transducer 26 (via comparator 42) until the pressure reaches the predetermined level selected by the controller 114. When this pressure is reached, microprocessor 3o opens advance relay 110, thereby stopping the advance of the wrench.

As the wrench advances, microprocessor 30 stores the last 20 pressure reading of comparator 42. When the advance cycle is interrupted these 20 data points plus one a number representing the total number of pressure readings taken over the complete cycle (i.e. 21 data points in all) are sent to computer 114 (See FIGS. 9D and 14F).

Referring to FIG. 14F, the program for controller 114 then calculates an average slope (Pressure/$time$) for the just completed cycle by dividing the final pressure reading by the total number of readings taken. This is represented as dPave on FIGS. 11-13. The controller 114 then calculates the slope $dP_f$(Pressure/$time$) for the last 10 points taken during the cycle:

$$(P_{20} - P_{10})/10 = dP_f$$

where $P_{20}$ is the last pressure reading and $P_{10}$ is the 10th pressure reading in a string of 20 leading up to $P_{20}$.

The controller 114 then compares final slope $dP_f$ to the average slope dPave and compares the total number of points for this cycle to the last cycle to determine which of the following three conditions exist:

(a) If $dP_f$ is greater than dPave (FIG. 11), and as long as 1.1 × the number of pressure readings taken is equal to or greater than the number of readings taken on the immediately preceeding stroke. This condition is an intermediate stroke and the fastener is not yet tight. Another stroke is required.

(b) If $dP_f$ is greater than dPave (FIG. 12) and the number of readings taken is not greater than 1.1 times the number of readings taken on the immediately preceeding stroke. This condition is a "no ratchet" stroke, and a no ratchet stroke signal is displayed on display 118. The operator is advised to check the wrench set-up and another stroke is required to be initiated by the operator.

(c) If $dP_f$ is less than dPave (FIG. 13). This condition means that the wrench has stopped turning in mid stroke and the pressure target has been reached. Therefore, this is the last stroke and the operator is advised to move the wrench to the next fastener; and the printer supplies a print out of the torque level and historical data.

Figure 14H:
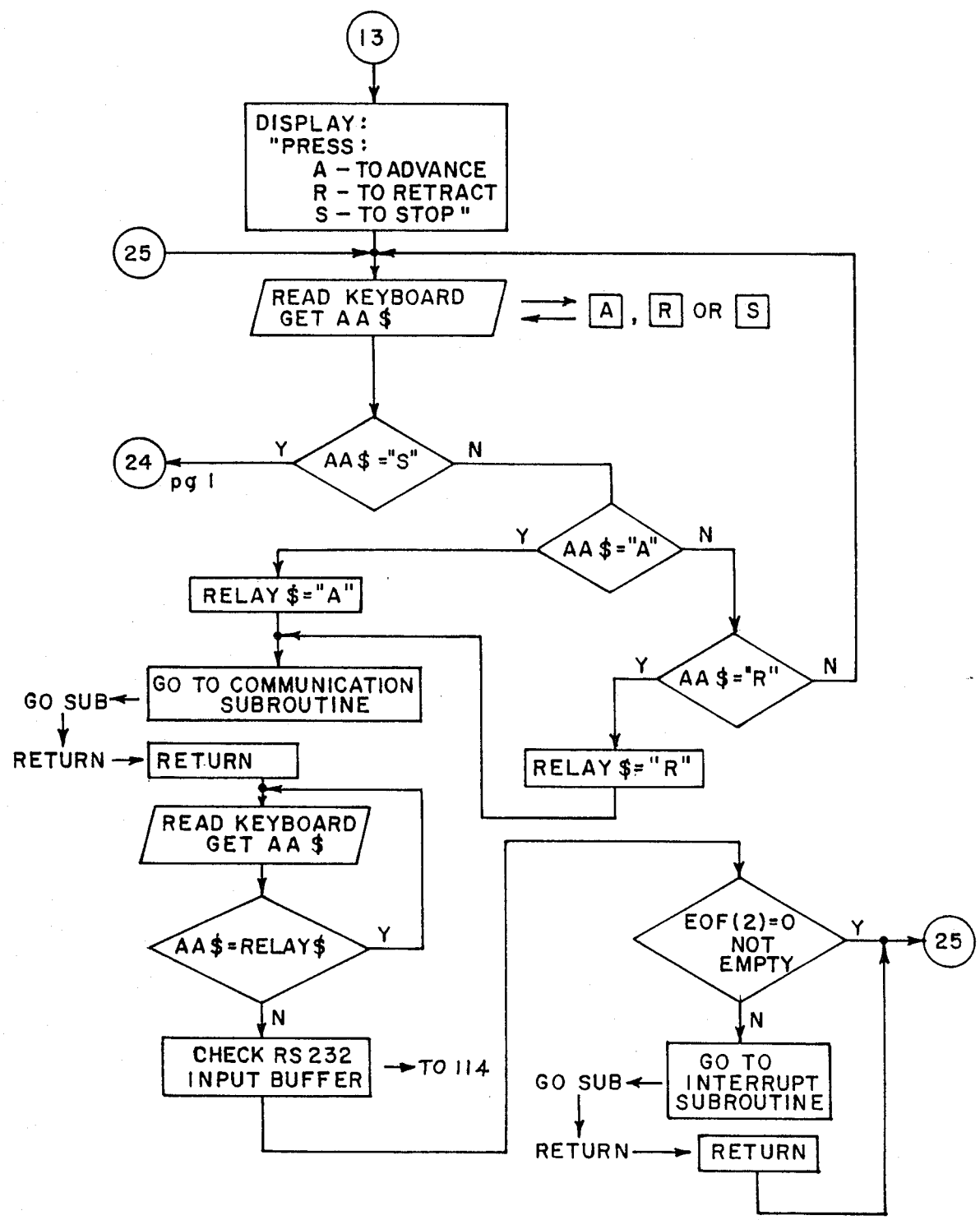
Figure 141:
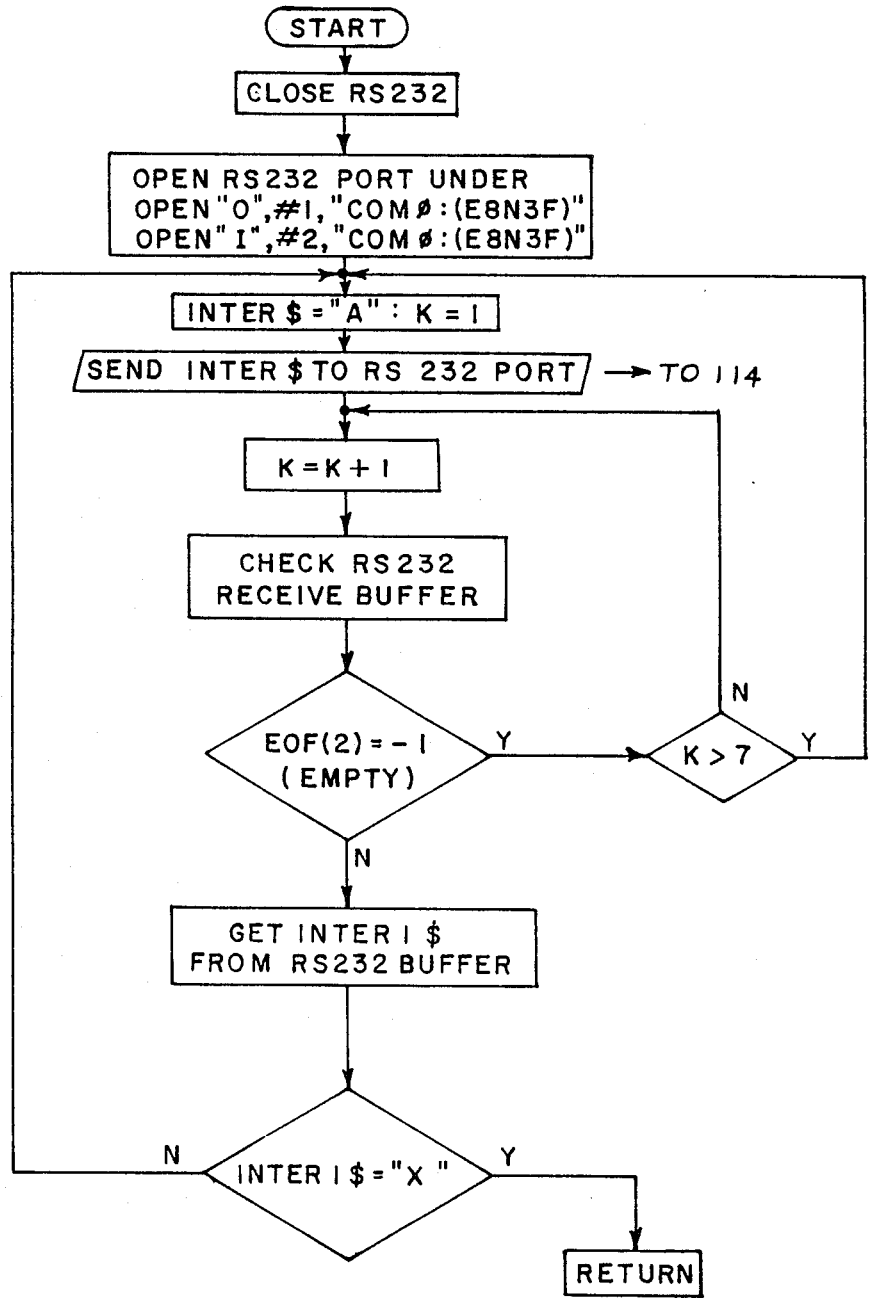
Figure 14J:
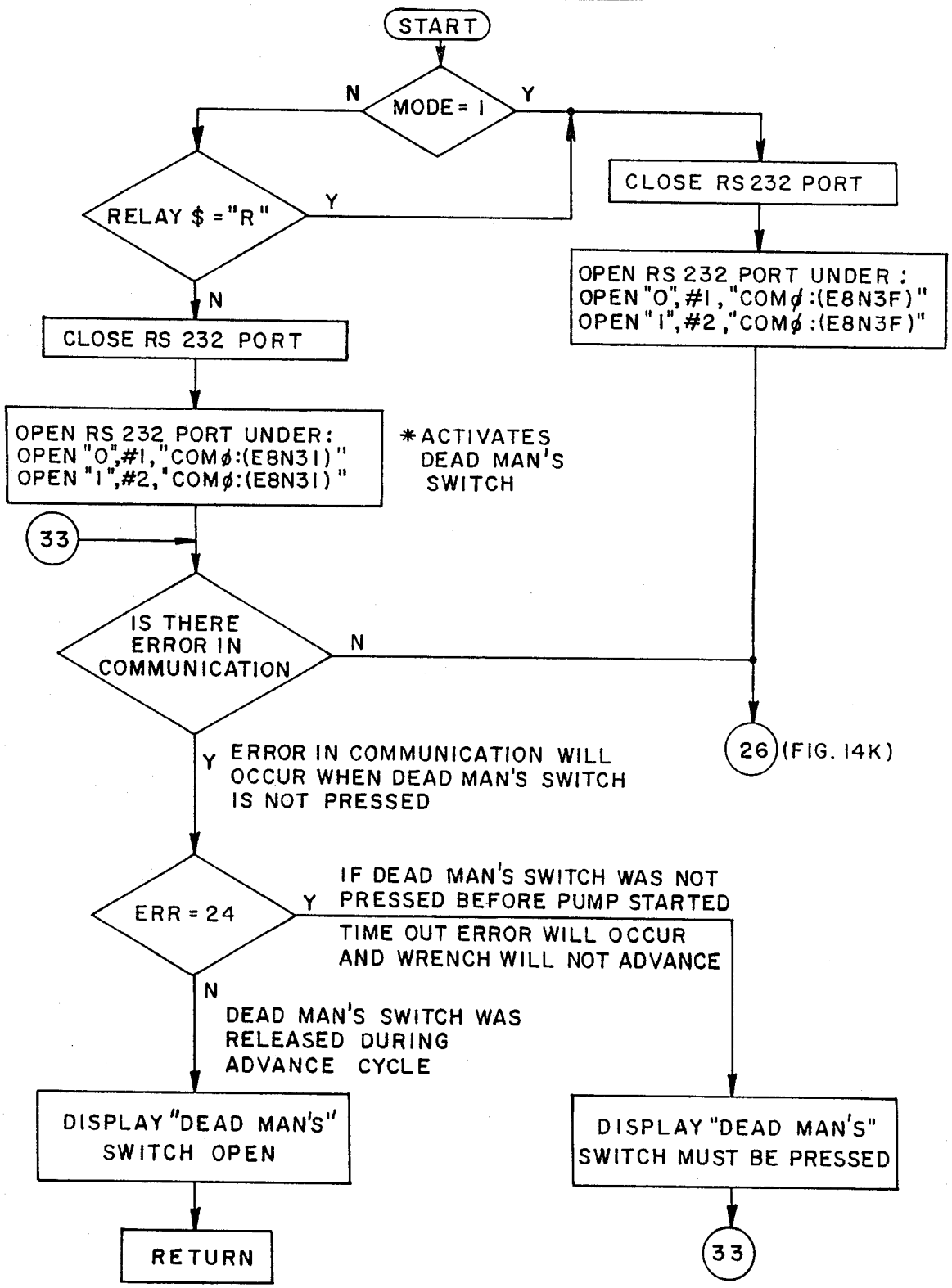
Figure 14K:
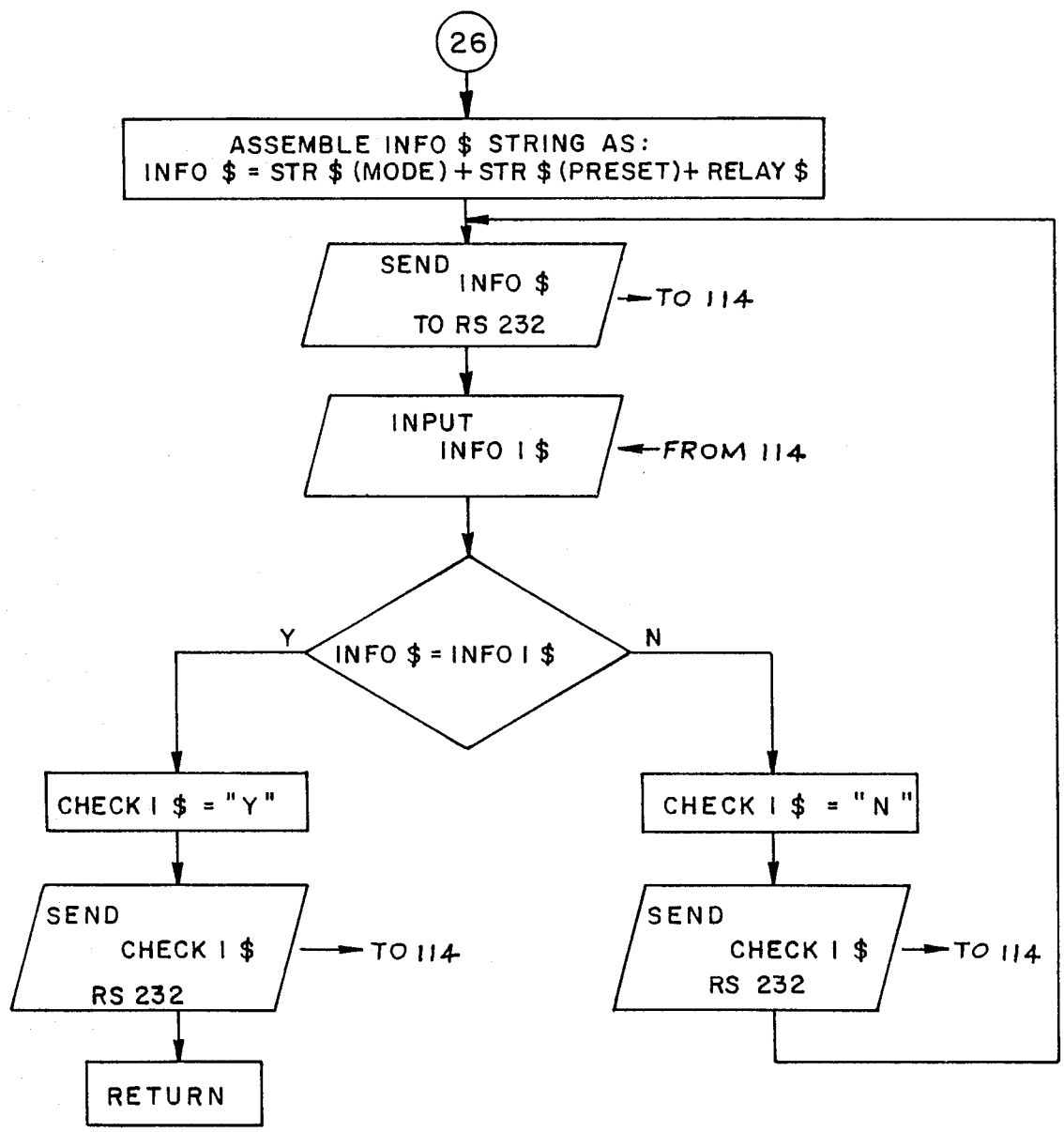

FIG. 14H shows the flow chart for the manual (semi-automatic) mode of operation.

In accordance with another feature of the present invention, the torque-turn relationship can be used to determine the nut factor, K, and to determine the preload on the fastener; and the cut-off torque level can be adjusted to assure that the desired preload (i.e. force) is imposed on the fastener system.

In making up a joint, e.g. a flange with a ring of bolts, an objective is to establish the same preloading (i.e. force) in each fastener. However, the lubricity of each fastener unit (e.g. a bolt and a nut) will differ from one fastener unit to another, for a variety of reasons, such as lubrication, dirt, galling, etc. The present invention provides a method to equalize or more nearly equalize the preload in each fastener unit, to thus provide a more optimum joint.

As the bolt is being tightened on each intermediate stroke of the wrench, pressure data is being obtained which can be used to determine the torque-turn relationship, the nut factor and preload. As the wrench turns through an angle $\theta$ for the entire forward stroke, numerous pressure readings P are taken and the data is stored in the memory of computer 114 or microprocessor 30. The difference $\Delta P$ in pressure between the pressure $P_2$ at the end of the stroke and $P_1$ at the beginning of the stroke is commensurate with the torque T imposed on the fastener during the stroke. $P_1$ is the pressure at which the pressure increase during a stroke approaches the linear range after a short initial part of the stroke (see, e.g. FIGS. 11-13).

By combining three known theoretical equations used in bolting, it is possible to determine the approximate nut factor K and preload for a particular fastener unit in a joint. The short term torque-preload equation is $$T = K \, D F_p \tag{1}$$

where:
T = applied torque (in.-lbs.)
D = nominal bolt diamter (in.)
$F_p$ = preload in the bolt (lbs.)
K = nut factor The theoretical turn-preload equation is $$F_p = \theta \frac{K_B K_J}{K_B + K_J} \frac{Pi}{360} \tag{2}$$

where:
$\theta$ = turn of the nut (degrees)
$K_B$ = bolt stiffness (lbs./in.)
$K_J$ = joint stiffness (lbs./in.)
Pi = pitch of the threads (in.)
$F_p$ = preload ($K_B$ and $K_J$ are determined in known manner from the material and geometry of bolt and joint, respectively). The torque-pressure equation for determining torque produced by a given wrench is $$T = A_c P L \tag{3}$$

where
$A_c$ = cross-sectional area of wrench drive cylinder (in.$^2$)
L = length of lever arm of the wrench (in.)
P = cylinder pressure (psi)

From equations (1), (2) and (3), the following equation is derived for the nut factor during each stroke $$K = \frac{\Delta P}{\Delta \theta} \left[ \frac{L \, A_c}{D \left( \frac{K_B K_J}{K_B + K_J} \right) \frac{Pi}{360}} \right] \tag{4}$$

where
K = nut factor
L = length of wrench lever arm (in.)
Ac = cross sectional area of wrench piston
$K_B$ = bolt stiffness (lbs/in)
$K_J$ = joint stiffness (lbs/in)
D = nom. diam of bolt
$\Delta P$ = change in pressure during wrench stroke ($P_2 - P_1$) (psi)
$\Delta \theta$ = angular stroke of wrench or change in "angle" of nut;
Pi = pitch of threads (inch)

With K known, the torque to be applied to obtain a desired preload can be adjusted in accordance with Equation (1) to obtain a desired preload in each fastener unit in a joint.

The importance of this feature is that it provides a way to take into account the nut factor differences in each fastener unit to arrive at a final joint configuration where all fastener units have the same or nearly the same preload. As indicated earlier, ideally each fastener unit in a joint should have the same preload. By deriving the nut factor K and then adjusting the torque T to obtain a target preload, the present system makes it possible to approach the ideal of equal preload in all fastener units in a joint.

In accordance with this system, the nut factor K can be determined for each tightening stroke of the wrench; or it may be determined for only the one or two strokes prior to the final stroke. With the nut factor K known, the torque T needed to obtain a desired preload can be determined from Equation (1), and then the selected cut-off torque inputed to the system of FIGS. 7–14L can be changed to the new level determined by the analysis of the torque-turn relationship. This adjustment of the selected cut-off torque can be done automatically by a program in computer 114, or it may be done manually by the operator.

In addition to predetermining the torque to be applied to obtain a desired preload in a fastener unit, this system also can provide an indication of incipient galling of a bolt and prevent irrevocable damage to the threads. Incipient galling is signalled by a significant increase in nut factor; the occurance of which tells the operator not to increase the cut-off torque level. Instead, the nut is loosened, and the threads of the bolt are cleaned, filed, lubricated or otherwise treated to avoid galling. Since galled threads must be removed by machining, this feature can lead to significant savings.

To implement this torque-turn system, a digital plotter 25A in FIG. 7 replaces the digital readout 25 of FIG. 1. Digital plotter 25A is connected to microprocessor 30 to receive all of the pressure readings from microprocessor 30 during the tightening stroke. (See flow chart 9D where these pressure readings are sent to digital plotter 25A just upstream of the decision block MMV≧PRESET). Digital plotter 25A produces Pressure versus Time plots like those shown in FIGS. 11–13 for each stroke of the wrench. Each fastener typically requires several (e.g. 3–7) wrench strokes to reach a preset torque. The operator selects an intermediate stroke (i.e., neither the first or the last) and preferably a middle stroke of the series of strokes to conduct the above described process for determining K and $F_p$ and redetermining the cut off torque level to obtain the desired preload. Preferably, to refine the process, the operator should use the data of the middle third of the Pressure vs Time plot to determine $\Delta P$ and use $\frac{1}{3}\theta$ for the turn data. Thus, with reference to FIG. 11, the operator would use the pressure levels at the time readings of 27 and 43 to determine a $P_1$ of 27 MMV and a $P_2$ of 38 MMV. (Of course, these MMV readings have to be multiplied by some constant factor (10.25 in this case) to convert the MMV readings to their equivalent pressure values.

In some applications, e.g. large studs and bolts for pressure vessels, pipelines and the like, it is a common practice to tighten the fastener in several passes. That is, in one pass all fasteners are tightened to a torque of e.g. 100 ft. lbs., then to 200 ft. lbs.in a second pass and then to the final torque of e.g. 300 ft. lbs. in a third pass. In this case, the torque-turn process for K determination, preload determination and torque redetermination can be carried out a the end of an intermediate pass, and a final cut-off torque can be determined for the final pass.

While the torque-turn/nut factor method has been described in terms of a method to be carried out manually by the operator, it will be understood that the method may be automated and carried out by computer control with an appropriate program.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of determining the preload applied to a fastener being tightened by a hydraulicly powered wrench, including the steps of:

measuring a first pressure $P_1$ of the operating fluid of the wrench during a tightening stroke;

measuring at least a second pressure $P_2$ of the operating fluid of the wrench during said tightening stroke, said second pressure being measured after said first pressure;

determining the pressure difference $\Delta P$ between the pressure $P_2$ and the pressure $P_1$, said pressure difference $\Delta P$ being commensurate with the torque T imposed on the fastener during the tightening stroke;

measuring the angular stroke $\Delta\theta$ of the wrench between the first pressure $P_1$ and the second pressure $P_2$;

determining the nut factor K of the fastener being tightened from data which includes $\Delta P$ and $\Delta\theta$;

determining the preload applied to the fastener from the relationship $$F_p = T/KD$$

where
 $F_P$=preload
 T=Torque
 D=diameter of the fastener
 K=nut factor.

2. The method of claim 1 wherein: said nut factor is determined from the relationship $$K = \frac{\Delta P}{\Delta \theta}\left[\frac{L\, A_c}{D\left(\frac{K_B K_J}{K_B + K_J}\right)\frac{P_i}{360}}\right]$$

where
 K=nut factor
 L=length of wrench lever arm (in.)
 Ac=cross sectional area of wrench piston
 $K_B$=bolt stiffness (lbs/in)
 $K_J$=joint stiffness (lbs/in)
 D=nom. diam of bolt
 $\Delta P$=change in pressure during wrench stroke (psi)
 $\Delta\theta$=angular stroke of wrench or change in "angle" of nut;
 Pi=pitch of threads (inch)

3. The method of claim 1 further including the step of:

applying a torque to the fastener based on the determined nut fact to obtain a desired preload.

4. The method of claim 1 wherein:

the first pressure $P_1$ is near the beginning of the tightening stroke; and the second pressure $P_2$ is near the end of the tightening stroke.

* * * * *